(12) United States Patent
White

(10) Patent No.: US 9,556,972 B2
(45) Date of Patent: Jan. 31, 2017

(54) ADJUSTABLE CABLE MANAGER

(75) Inventor: Gordon John White, Gloucestershire (GB)

(73) Assignee: CommScope Technologies LLC, Hickory, NC (US)

( * ) Notice: Subject to any disclaimer, the term of this patent is extended or adjusted under 35 U.S.C. 154(b) by 188 days.

(21) Appl. No.: 13/545,061

(22) Filed: Jul. 10, 2012

(65) Prior Publication Data

US 2013/0146721 A1 Jun. 13, 2013

Related U.S. Application Data

(60) Provisional application No. 61/508,155, filed on Jul. 15, 2011.

(51) Int. Cl.
| | |
|---|---|
| *F16L 3/02* | (2006.01) |
| *H04Q 1/06* | (2006.01) |
| *H04Q 1/02* | (2006.01) |
| *H02G 3/32* | (2006.01) |
| *A47B 97/00* | (2006.01) |
| *H02G 7/05* | (2006.01) |

(52) U.S. Cl.
CPC . *F16L 3/02* (2013.01); *H02G 3/32* (2013.01); *H04Q 1/06* (2013.01); *H04Q 1/131* (2013.01); *A47B 2097/003* (2013.01); *H02G 7/05* (2013.01); *H04Q 1/13* (2013.01)

(58) Field of Classification Search
CPC ............... H02G 3/32; H04Q 1/131; F16L 3/02
USPC ................. 248/68.1, 74.4; 174/146
See application file for complete search history.

(56) References Cited

U.S. PATENT DOCUMENTS

| | | | | |
|---|---|---|---|---|
| 429,357 | A * | 6/1890 | McBee | 248/68.1 |
| 1,893,166 | A * | 1/1933 | Fox | 248/75 |
| 3,023,989 | A * | 3/1962 | White | 248/68.1 |
| 3,430,903 | A * | 3/1969 | Gunther | 248/68.1 |
| 3,746,291 | A * | 7/1973 | Kuhn | 248/68.1 |
| 4,131,257 | A * | 12/1978 | Sterling | 248/67.5 |
| 4,892,275 | A * | 1/1990 | Szegda | 248/61 |
| 5,582,612 | A * | 12/1996 | Lin | 606/250 |

(Continued)

FOREIGN PATENT DOCUMENTS

| | | | | |
|---|---|---|---|---|
| DE | 718025 | C * | 2/1942 | |
| DE | 3416512 | C1 * | 7/1985 | F16L 3/22 |

(Continued)

OTHER PUBLICATIONS

International Search Report and Written Opinion for PCT/US2012/046153 mailed Jan. 29, 2013.

*Primary Examiner* — Katherine Mitchell
*Assistant Examiner* — Chiedu Chibogu
(74) *Attorney, Agent, or Firm* — Merchant & Gould P.C.

(57) ABSTRACT

A cable manager includes a first portion and a second portion that cooperate to retain at least one cable. The first portion of certain types of cable managers is configured to be held in one or more rotationally fixed positions relative to the second portion. For example, the second portion may include at least one retaining arm that extends at least partially over a cable cradle of the first portion when the second portion is rotated to a closed position and that allows access to the cable cradle when rotated to an open position. The first portion of certain types of cable managers is configured to be held in one of a plurality of axially fixed positions relative to the second portion to accommodate cables of different diameters.

11 Claims, 29 Drawing Sheets

(56) References Cited

U.S. PATENT DOCUMENTS

| | | | |
|---|---|---|---|
| 5,613,968 A * | 3/1997 | Lin | 606/320 |
| 6,175,079 B1 | 1/2001 | Johnston et al. | |
| 6,206,879 B1 * | 3/2001 | Marnay et al. | 606/53 |
| 6,398,149 B1 * | 6/2002 | Hines et al. | 242/399 |
| 6,979,064 B2 * | 12/2005 | Chiu | 312/221 |
| 7,077,688 B2 * | 7/2006 | Peng | 439/471 |
| 7,491,008 B2 * | 2/2009 | Thomke et al. | 403/373 |
| 7,619,164 B2 * | 11/2009 | Caveney et al. | 174/99 R |
| 7,657,985 B2 * | 2/2010 | McClure | 29/271 |
| 7,686,259 B2 * | 3/2010 | Caveney et al. | 248/68.1 |
| 7,770,852 B2 * | 8/2010 | Caveney | 248/68.1 |
| 7,817,444 B2 | 10/2010 | Dennes | |
| 8,093,501 B2 | 1/2012 | Stansberry, Jr. | |
| 8,226,058 B2 * | 7/2012 | Chen | 248/219.4 |
| 8,551,146 B2 * | 10/2013 | Kumar et al. | 606/305 |
| 8,708,290 B2 * | 4/2014 | Franta | 248/68.1 |
| 8,827,997 B2 * | 9/2014 | Cremer et al. | 606/59 |
| 2005/0171537 A1 * | 8/2005 | Mazel et al. | 606/61 |
| 2005/0211463 A1 * | 9/2005 | Zeuner et al. | 174/138 G |
| 2006/0171075 A1 | 8/2006 | Caveney et al. | |
| 2010/0226616 A1 | 9/2010 | Zheng | |
| 2011/0011612 A1 | 1/2011 | Sayres | |
| 2015/0060612 A1 * | 3/2015 | Blanchard et al. | 248/74.3 |
| 2015/0076087 A1 * | 3/2015 | Kaml et al. | 211/26 |

FOREIGN PATENT DOCUMENTS

| | | | |
|---|---|---|---|
| DE | 102009038911 A1 * | 3/2011 | |
| DE | 102010007256 A1 * | 8/2011 | |
| GB | 1413547 A * | 11/1975 | |
| WO | WO 2010053777 A2 * | 5/2010 | |
| WO | WO 2010053777 A2 * | 4/2011 | |
| WO | WO 2011161923 A1 * | 12/2011 | |

* cited by examiner

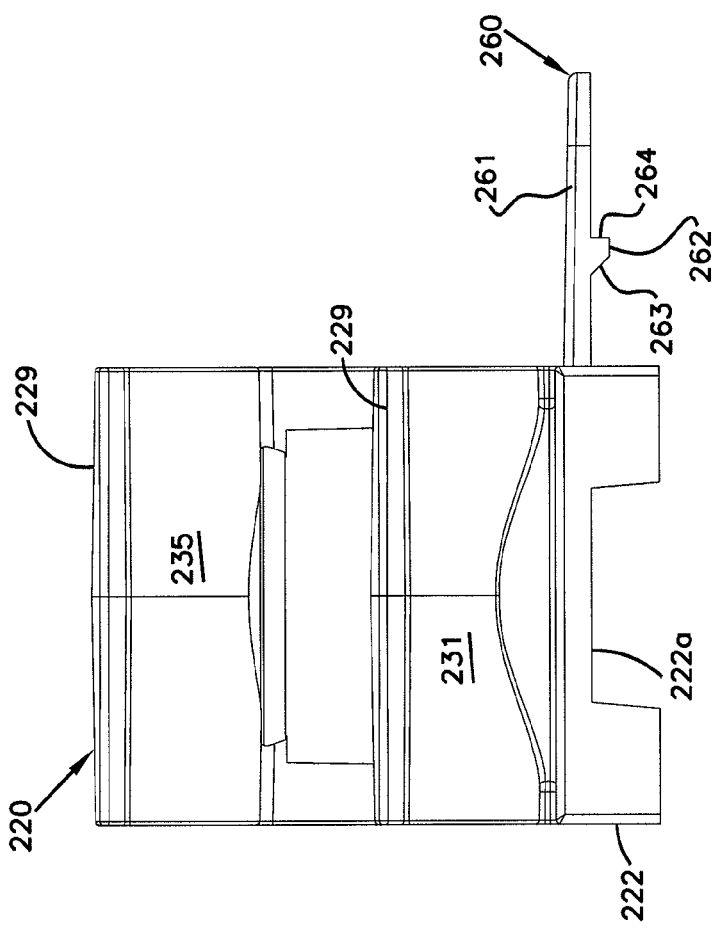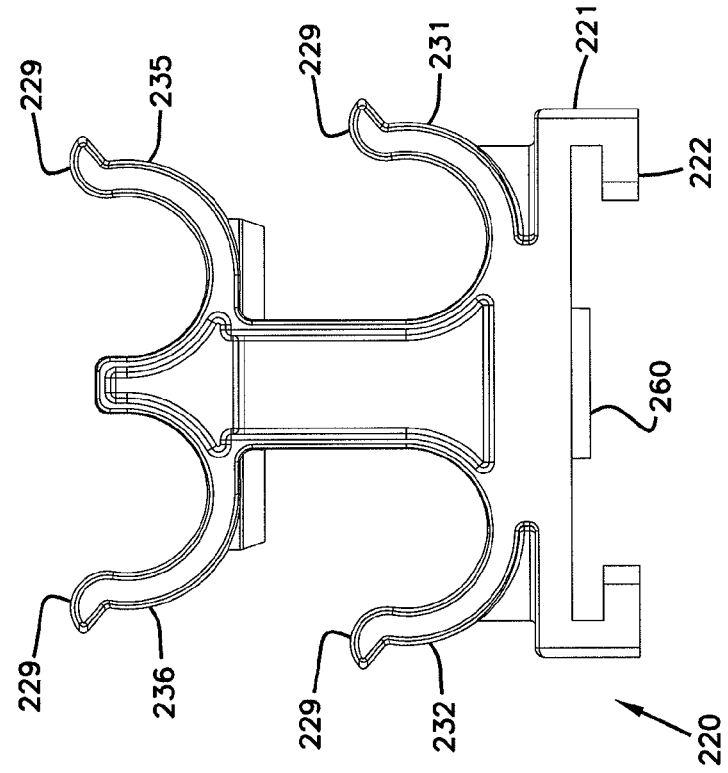

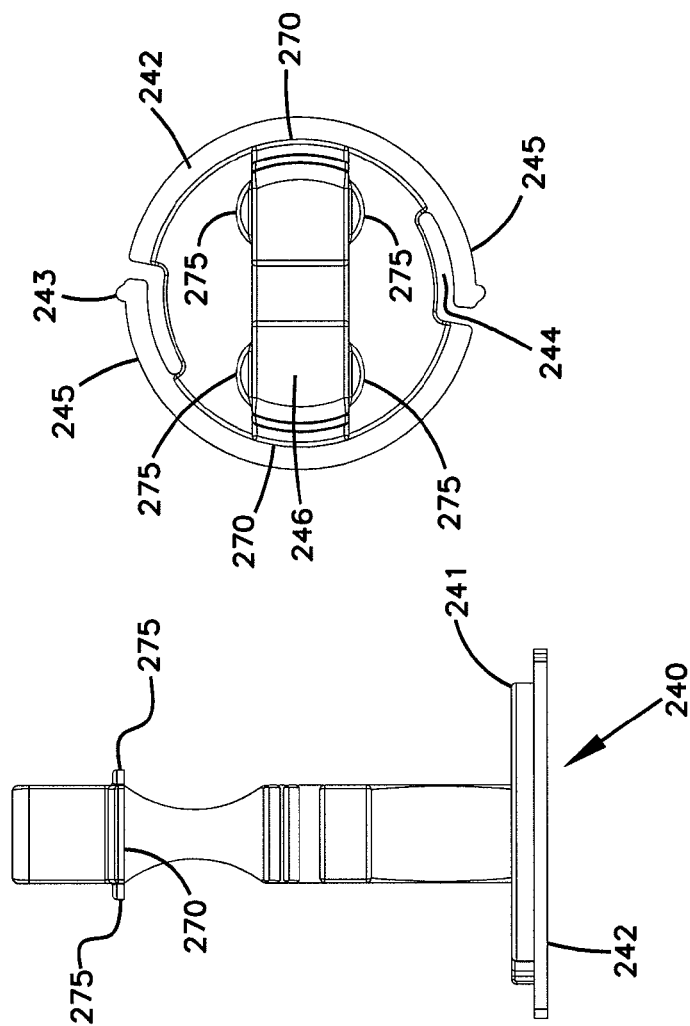
FIG. 35
FIG. 34
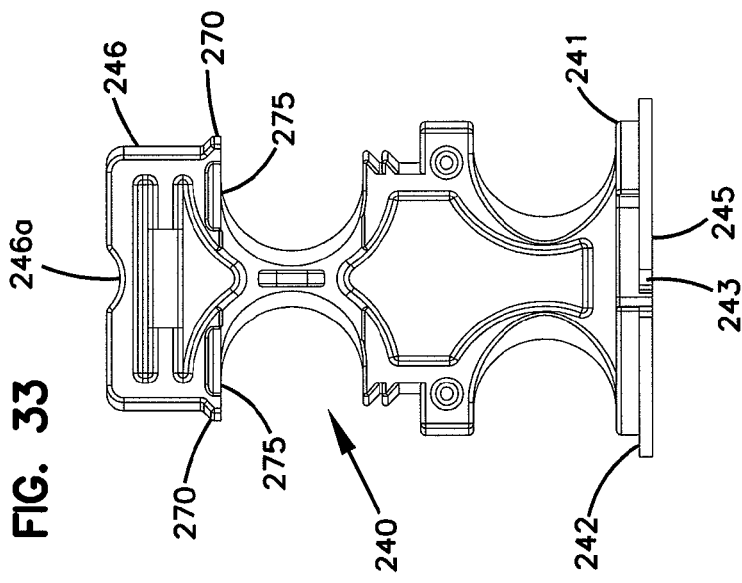
FIG. 33

ADJUSTABLE CABLE MANAGER

CROSS-REFERENCE TO RELATED APPLICATIONS

The present application claims the benefit of U.S. Provisional Application No. 61/508,155, filed Jul. 15, 2011, and titled "Telecommunications Cable Manager," the disclosure of which is hereby incorporated herein by reference.

TECHNICAL FIELD

The present disclosure relates generally to devices for use in the telecommunications industry, and various methods associated with such devices. More particularly, this disclosure relates to cable management arrangements, and various methods associated with cable management.

BACKGROUND

Telecommunications systems utilize fiber optic cables and/or copper cables to interconnect pieces of telecommunications equipment. The pieces of telecommunications equipment are commonly mounted to racks, cabinets, or other framework structures. Because of the large number of cables associated with such telecommunications systems, effective cable management is crucial. Ease of cable organization and cable management adaptation are factors related to effective cable management. In general, conventional arrangements for managing cable can be improved.

SUMMARY

The present invention relates to a cable manager for use in a telecommunications panel, rack, or structure. The cable manager includes a base and a clamp. The clamp is configured to move axially and/or rotationally relative to the base. In some implementations, the clamp is configured to be held in one of a plurality of rotationally fixed positions relative to the base. In some implementations, the clamp is configured to be held in one of a plurality of axially fixed positions relative to the base.

Certain types of cable managers are configured to separate out individual cables from each other, thereby inhibiting alien crosstalk between the cables. Certain types of cable managers are configured to raise the cables off a metal frame attached to a panel, thereby improving the alien crosstalk performance of the panel.

A variety of examples of desirable product features or methods are set forth in part in the description that follows, and in part will be apparent from the description, or may be learned by practicing various aspects of the disclosure. The aspects of the disclosure may relate to individual features as well as combinations of features, including combinations of features disclosed in separate embodiments. It is to be understood that both the foregoing general description and the following detailed description are explanatory only, and are not restrictive of the claimed invention.

BRIEF DESCRIPTION OF THE DRAWINGS

FIG. 31 is a rear elevational view of the base of FIG. 30;

FIG. 32 is a side elevational view of the base of FIG. 30;

FIG. 33 is a front elevational view of the clamp of FIG. 30;

FIG. 34 is a side elevational view of the clamp of FIG. 30;

FIG. 35 is a top plan view of the clamp of FIG. 30;

DETAILED DESCRIPTION

Figure 1:
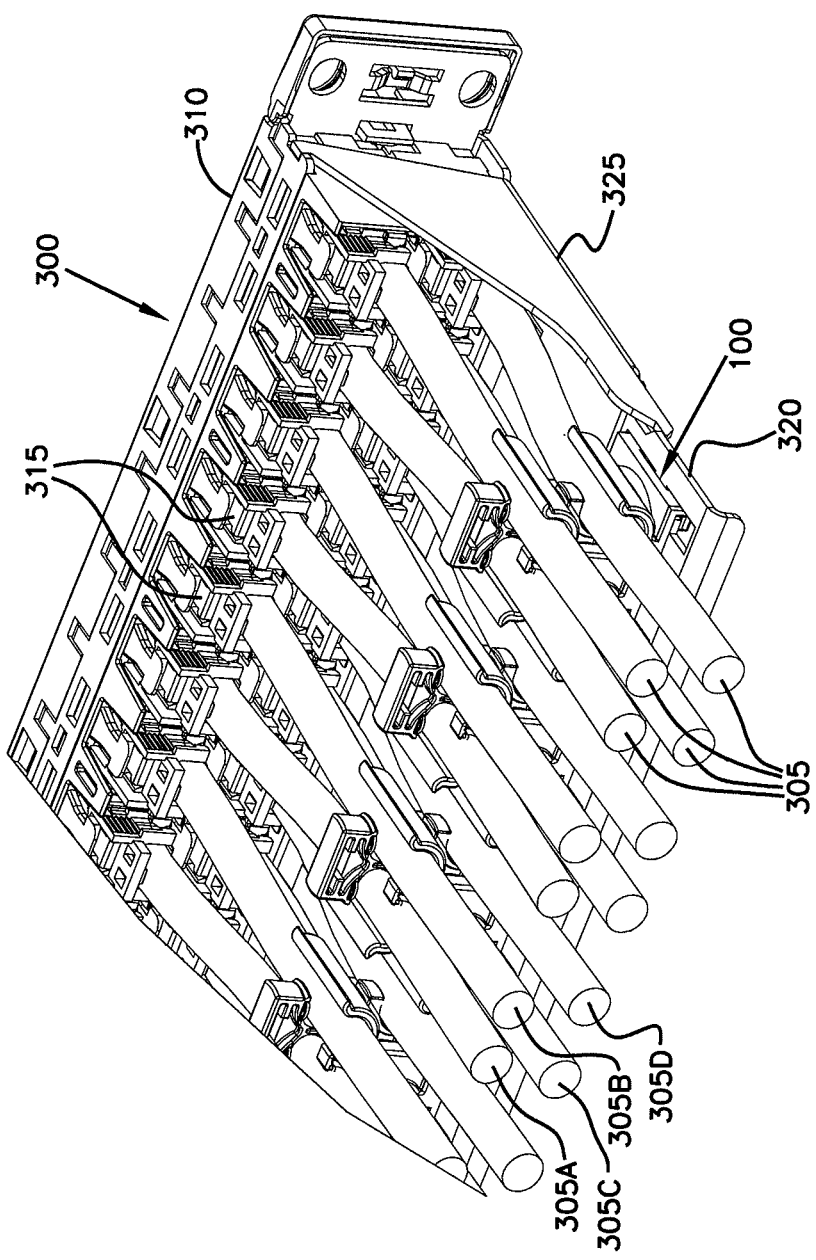
FIG. 1 is a rear perspective view of a portion of an example panel holding jack modules and a management panel at which cable managers are mounted to hold cables extending rearwardly from the jacks.

Reference will now be made in detail to exemplary aspects of the present disclosure that are illustrated in the accompanying drawings. Wherever possible, the same reference numbers will be used throughout the drawings to refer to the same or like parts.

In accordance with aspects of the disclosure, an example cable manager includes a first portion and a second portion that is rotatable relative to the first portion between open and closed positions. The first portion defines at least a first cable cradle that is configured to receive a first cable. The second portion includes a first retaining arm that extends at least partially over the first cable cradle when the second portion is in the closed position. The first retaining arm moves to provide access to the first cable cradle when the second portion is in the open position. In certain implementations, the first cable cradle receives a first cable that extends along a first axis; and the second portion is configured to rotate about a rotation axis that is not parallel with the first axis. In certain implementations, the first portion defines a plurality of cable cradles and the second portion defines a plurality of retaining arms.

In accordance with some aspects, the second portion is configured to move axially along the rotation axis relative to the first portion. In some implementations, a retention arrangement holds the second portion in at least a first axially fixed position relative to the first portion. In certain implementations, the retention arrangement enables the second portion to be retained relative to the first portion in one of a plurality of fixed axial positions.

In accordance with some aspects, the second portion includes a locking arrangement that rotationally fixes the second portion relative to the first portion. In some implementations, the locking arrangement includes a locking member that is configured to be received in one of a plurality of notches defined in the first portion. In certain implementations, the locking member of the second portion is configured to flex to move between the notches of the first portion.

In accordance with some aspects, the first portion includes a mounting arrangement that couples the first portion to a frame or other surface. In some implementations, the mounting arrangement includes guides through which retention flanges of the frame can slide. In certain implementations, the mounting arrangement includes a pair of inwardly facing guides extending in a front-to-rear direction of the first portion.

In accordance with some aspects, the first portion defines at least two cable cradles that are each configured to receive a cable. In some implementations, the two cable cradles are laterally spaced from each other. In other implementations, the two cable cradles are axially spaced from each other. In certain implementations, the first portion includes four cable cradles. For example, in certain implementations, the first portion includes a top tier of cable cradles and a bottom tier of cable cradles. In certain implementations, the top tier is narrower than the bottom tier. The laterally and axially spaced cable cradles separate out individual cables from each other, thereby inhibiting alien crosstalk between the cables. The cable cradles also raise the cables off a metal frame to which the manager is attached, thereby improving alien crosstalk performance.

FIGS. 1-29 illustrate one example implementation of a cable manager 100 suitable for mounting to a panel frame 310. FIG. 1 shows a rear of a communications panel 300 including one example panel frame 310 holding a plurality of jack modules 315. A management frame 320 is coupled to the panel frame 310 via arms 325. Cables 305 terminated by the jack modules 315 extend rearwardly from the jack modules 315 towards a management frame 320. The jack modules 315 are configured to receive connectorized ends of patchcords or other connectorized cable to electrically connect the patchcords to the rearwardly extending cables 305.

One or more example cable managers 100 are mounted to the management frame 320 to organize the rearwardly extending cables 305. Each cable manager holds 100 one or more of the cables 305. In certain implementations, the panel frame 310 holds a single row of jacks 315 and the cable manager 100 holds one or two cables 305 of the row. In other implementations, the panel frame 310 holds two rows of jacks 315 and each cable manager 100 holds one or more cables 305 from each of the rows. In the example shown, each cable manager 100 holds two adjacent cables 305 from each of two rows of jacks 315. In other implementations, the panel frame 310 and the cable managers 100 may accommodate an even greater number of jack module rows.

Figure 2:
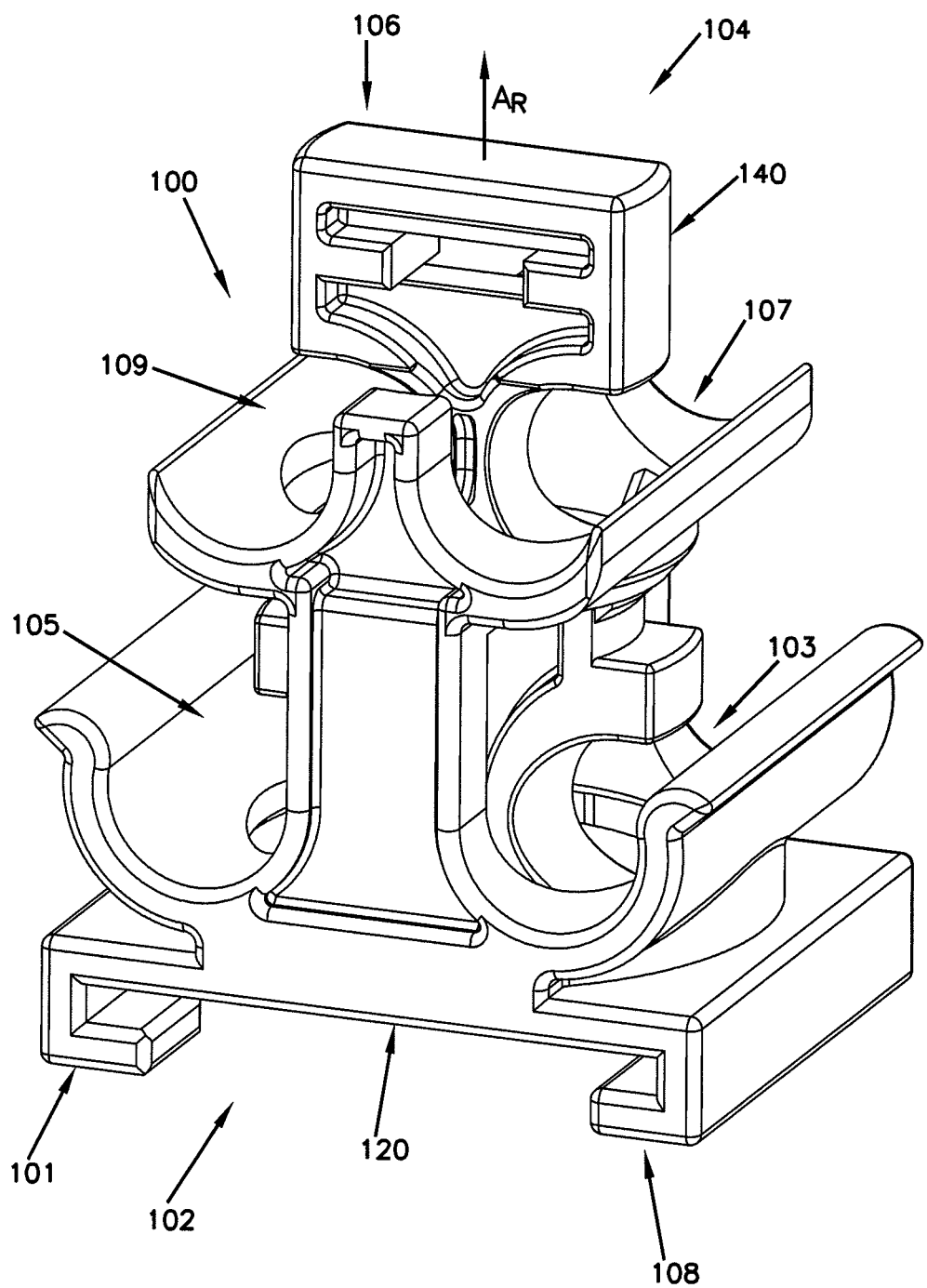
FIG. 2 is a front, top perspective view of a cable manager including a base and a clamp configured in accordance with the principles of the present disclosure.

FIG. 2 is a perspective view of an example implementation of a cable manager 100 suitable for use with a communications panel, such as communications panel 300 of FIG. 1. The cable manager 100 has a front 102, a rear 104, a top 106, and a bottom 108. The bottom 108 of the cable manager 100 defines a mounting arrangement 101 at which the cable manager 100 is coupled to a management frame 320 or other surface. Further details pertaining to how the frame mount arrangement 101 is secured to the management frame 320 is provided herein with reference to FIGS. 7 and 8.

The cable manager 100 includes at least a first cable receiving area 103 that is configured to receive at least one cable 305. In some implementations, the cable manager 100 also includes a second cable receiving area 105 configured to hold at least one cable 305. In certain implementations, the first and second cable receiving areas 103, 105 are located at generally the same height. In other implementations, the second cable receiving area 105 is located above or below the first cable receiving area 103.

In some implementations, the cable manager 100 also includes a third cable receiving area 107 configured to hold at least one cable 305 and a fourth cable receiving area 109 configured to hold at least one cable 305. In certain implementations, the first and second receiving areas 103, 105 form a first tier of the cable manager 100 and the third and fourth receiving areas 107, 109 form a second tier of the cable manager 100. In the example shown, the first tier is wider than the second tier. In other implementations, the cable manager 100 may include even more cable receiving areas forming one or more tiers.

Each of the cable receiving areas 103, 105, 107, 109 is configured to receive at least one cable extending in a forward-rearward direction relative to the manager 100. In the example shown, each cable receiving area 103, 105, 107, 109 is configured to receive a single cable 305. In some implementations, the cable receiving areas 103, 105, 107, 109 are configured to hold cables 305 having a common diameter or range of diameters. In other implementations, some of the cable receiving areas can accommodate larger cables than others of the cable receiving areas.

In some implementations, the cable manager 100 includes a first portion 120 and a second portion 140. The first and second portions 120, 140 cooperate to form the cable receiving areas 103, 105, 107, 109. In some implementations, the second portion 140 is moveable relative to the first portion 120 between an open position (see FIG. 9) and a closed position (FIG. 2) to enable the cables 305 to be loaded and secured, respectively. In certain implementations, the second portion 140 rotates relative to the first portion 120 between the open and closed positions. In certain implementations, the second portion 140 rotates relative to the first portion 120 between one of a plurality of rotationally fixed positions including an open position and a closed position as will be described in more detail herein.

The second portion 140 rotates about an axis of rotation AR that extends through the cable manager 100. In some implementations, the axis of rotation AR extends in a direction that is not parallel to the forward-rearward direction. In certain implementations, the axis of rotation AR extends in a direction that is generally orthogonal to the forward-rearward direction. In the example shown, the axis of rotation AR extends in a top-bottom direction relative to the cable manager 100. In the example shown, the axis of rotation AR extends between adjacent cable receiving areas.

In some implementations, the second portion 140 slides along the axis of rotation AR relative to the first portion 120. In certain implementations, the second portion 140 may be fixed at one or more axial positions relative to the first portion 120. In the example shown, the second portion 140 is configured to be held at one of three axial positions as will be described in more detail herein. In another implementation, the second portion 140 may be held at one of two axial positions. In other implementations, however, the second portion 140 is configured to lock to the first portion 120 at a greater or lesser number of positions.

Figure 3:
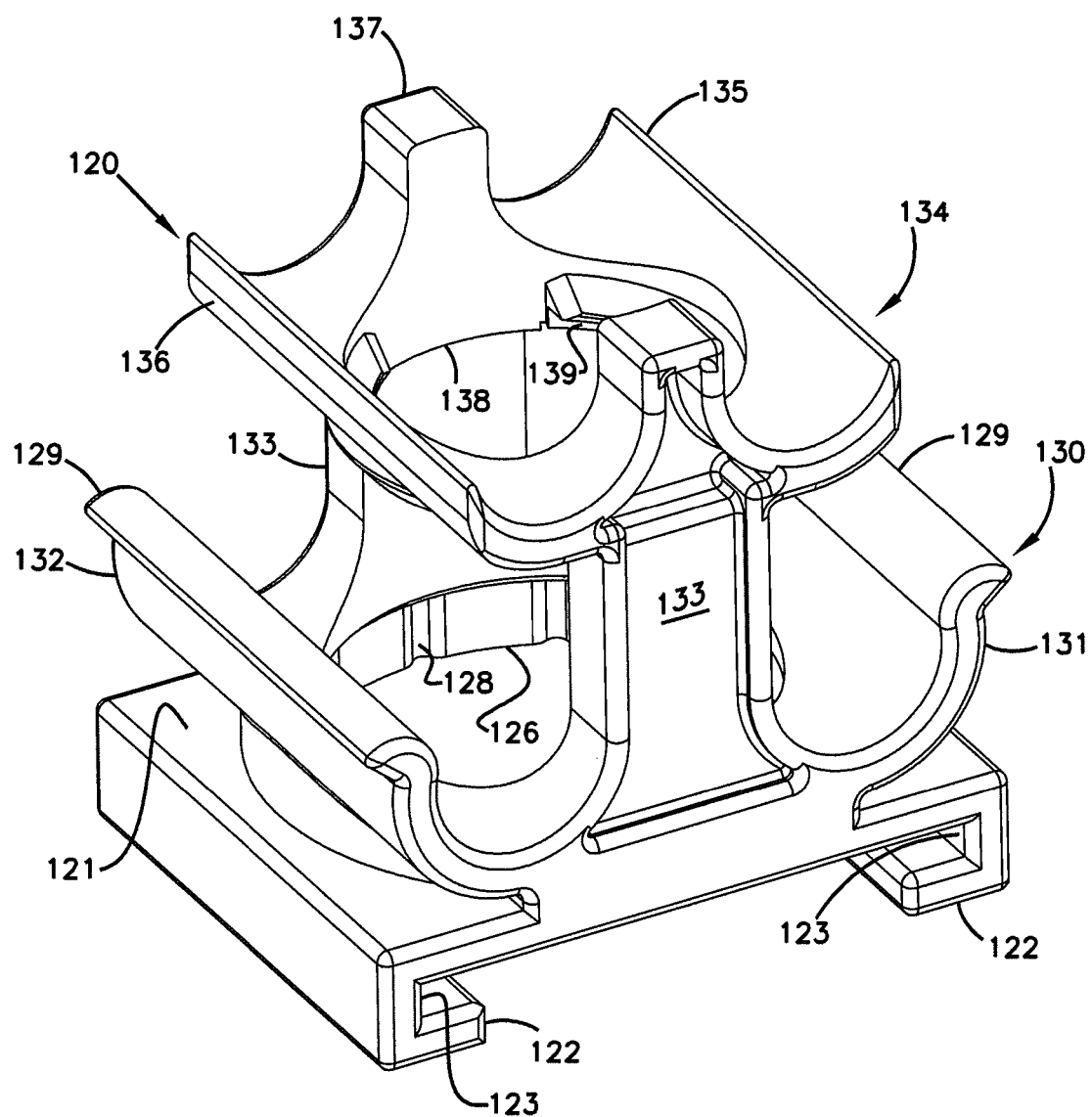
FIG. 3 is a front, top perspective view of the base of FIG. 2 configured in accordance with the principles of the present disclosure.
Figure 4:
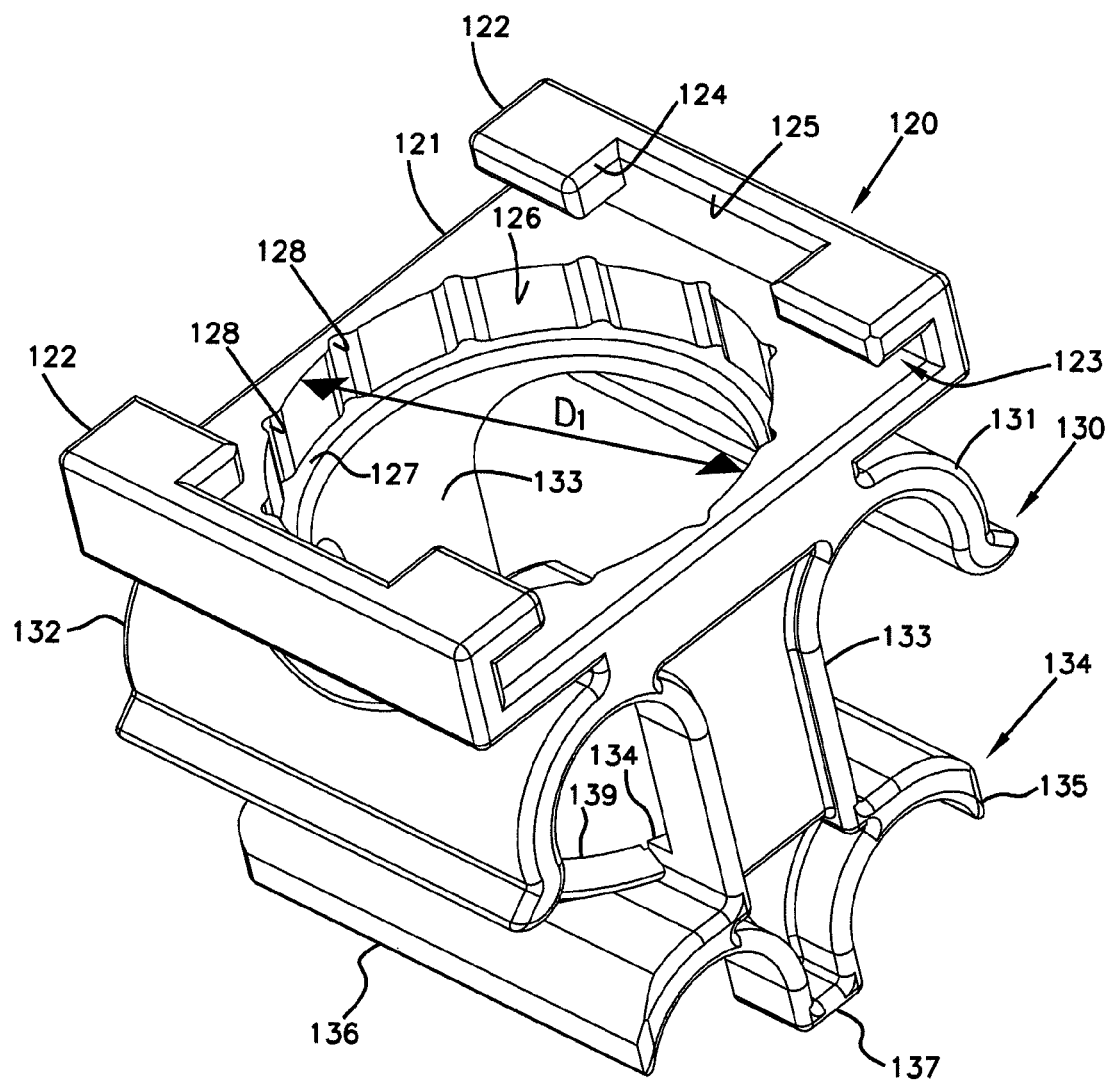
FIG. 4 is a front, bottom perspective view of the base of FIG. 3.
Figure 5:
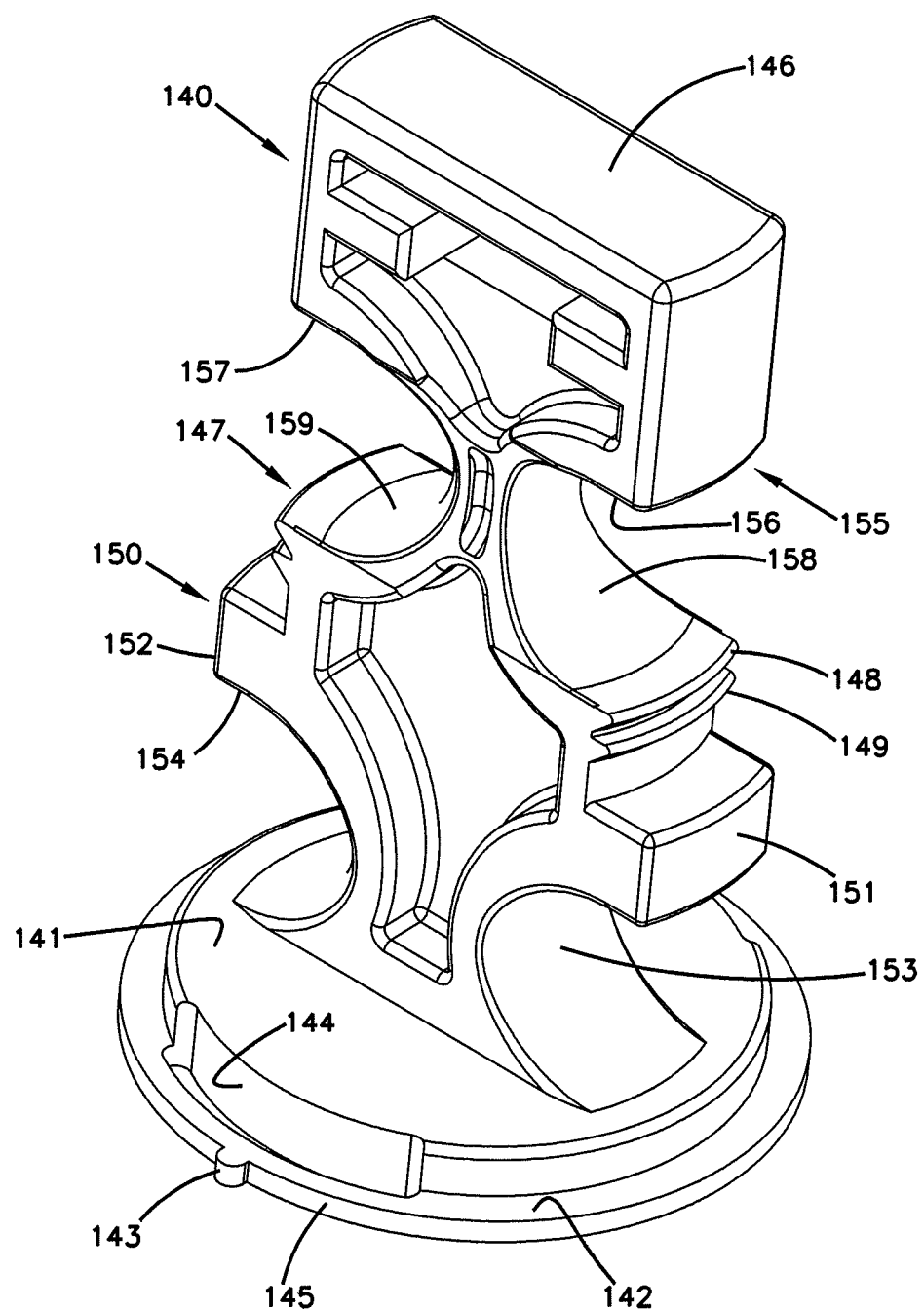
FIG. 5 is a front, top perspective view of the clamp of FIG. 2 configured in accordance with the principles of the present disclosure.
Figure 6:
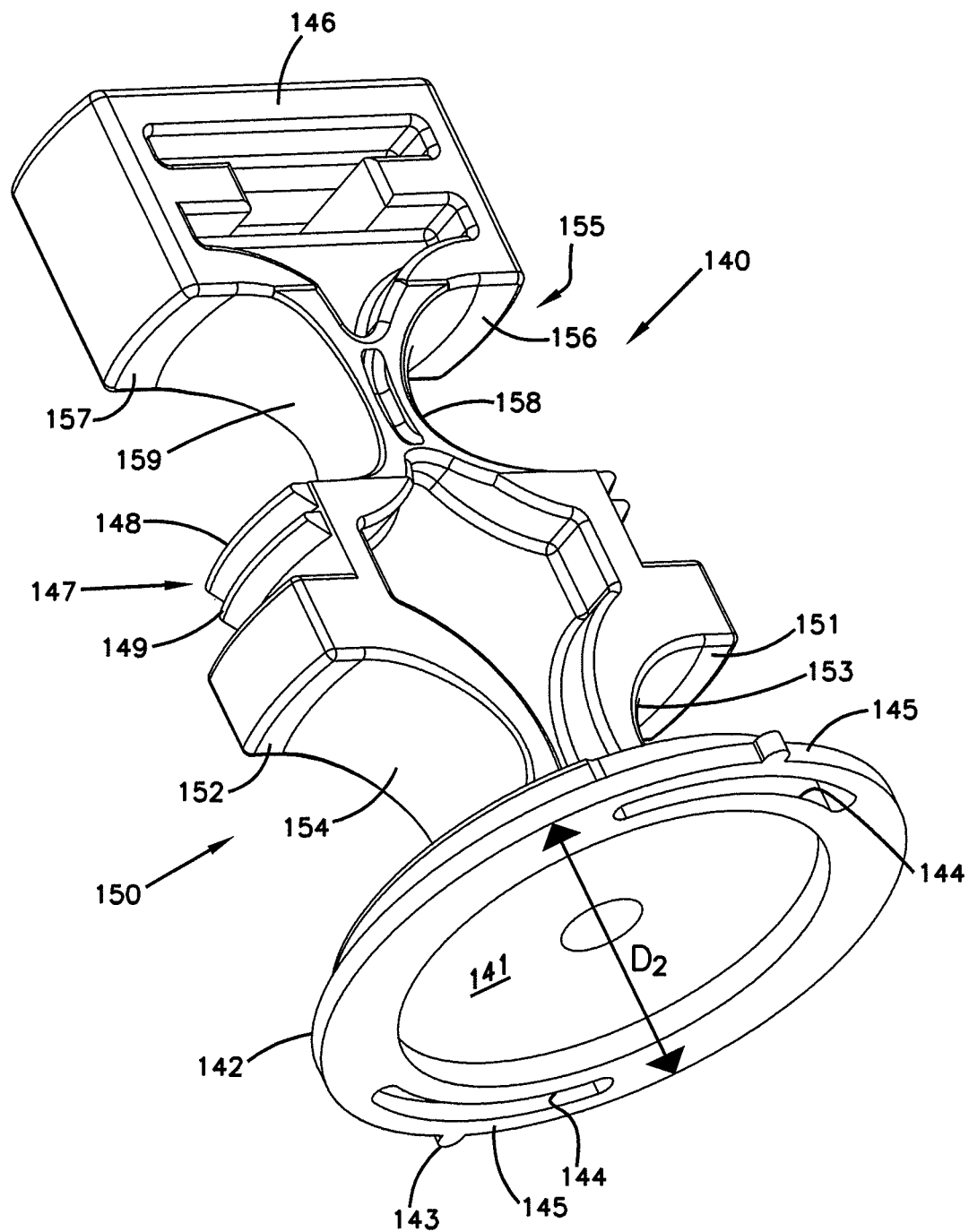
FIG. 6 is a front, bottom perspective view of the clamp of FIG. 5.

In accordance with some aspects, the first and second portions 120, 140 of the cable manager are formed from two separate pieces—a base 120 and a clamp 140. The clamp 140 is configured to be inserted into the base 120. The clamp 140 is selectively removable from the base 120. FIGS. 3 and 4 illustrate one example implementation of a base 120 suitable for mounting to a management frame 320 or other surface. FIGS. 5 and 6 illustrate one example implementation of a clamp 140 suitable for interacting with the base 120.

The example base 120 of FIGS. 3 and 4 includes a mount member 121 from which guides 122 extend downwardly to form the mounting arrangement 101 of the manager 100. In some implementations, the guides 122 are formed at opposite sides of the mount member 121. The guides 122 define channels 123 extending from the front 102 to the rear 104 of the manager 100. In some implementations, each guide 122 defines a notch 125 (FIG. 4) intermediate the front 102 and rear 104. The notch 125 breaks the guide 122 into a front guide portion and a rear guide portion. Each guide portion defining a shoulder 124 forming part of the notch 125.

The base 120 includes at least a first tier 130 of cable receiving areas. In some implementations, the first tier 130 includes only one cable receiving area. In other implementations, however, the first tier 130 includes a plurality of cable receiving areas. In the example shown, the first tier 130 of the base 120 includes a first cable cradle 131 and a second cable cradle 132. Each cable cradle 131, 132 includes a curved surface defining a channel that extends in a forward-rearward direction. Support members 133 extend upwardly from the mount member 121 between the first and second cable cradles 131, 132 at the front 102 and rear 104 of the manager 100. Sides of the support members 133 partially define the cable cradles 131, 132.

An aperture 126 extends through the mount member 121 in a top-bottom direction. In certain implementations, the aperture 126 also extends at least partially through the cable cradles 131, 132. In some implementations, a diameter D1 of the aperture 126 shrinks at the first tier 130 to define a downward facing ledge 127 (FIG. 4). Notches 128 are cut into an inner circumference of the aperture 126 below the ledge 127. In certain implementations, the notches 128 extend from the bottom of the mount member 121 to the ledge 127. In the example shown, twelve notches 128 are defined at the inner circumference of the aperture 126. In other implementations, however, the aperture 126 may have greater of fewer notches (e.g., one, two, four, five, six, eight, ten, sixteen, etc.).

In some implementations, the base 120 also includes a second tier 134 of cable receiving areas. In some implementations, the second tier 134 includes only one cable receiving area. In other implementations, however, the second tier 134 includes a plurality of cable receiving areas. In the example shown, the second tier 134 includes a first cable cradle 135 and a second cable cradle 136. Each cable cradle 135, 136 includes a curved surface defining a channel that extends in a forward-rearward direction. Tabs 137 extend upwardly from the support members 133 between the first and second upper cable cradles 135, 136 at the front 102 and rear 104 of the manager 100. Sides of the tabs 137 partially define the cradle channels 135, 136.

In some implementations, the first and second cable cradles 135, 136 of the second tier 134 are the same size as the first and second cable cradles 131, 132 of the first tier 130. In other implementations, the first and second cable cradles 135, 136 of the second tier 134 are smaller than the first and second cable cradles 131, 132 of the first tier 130. In still other implementations, the first and second cable cradles 135, 136 of the second tier 134 are larger than the first and second cable cradles 131, 132 of the first tier 130. In some implementations, all of the cable cradles 131, 132, 135, 136 have concave edges 129 that facilitate insertion of a cable 305 into the cradle. In other implementations, only the cradles 131, 132 of the first tier 130 have concave edges 129.

The second tier 134 defines a second aperture 138 that is bordered by the tabs 137 and the cable cradles 135, 136 of the second tier 134. In certain implementations, the second aperture 138 extends partially through the cable cradles 135, 136. In some implementations, an inner circumference of the second aperture 138 defines a lip or tooth 139. In certain implementations, the inner circumference of the second aperture 138 defines multiple lips or teeth 139. In the example shown, the second aperture 138 defines two lips 139 located at opposite sides of the inner circumference. The lips 139 ramp downwardly to define a downward facing shoulder.

As shown in FIGS. 5 and 6, the example clamp 140 extends from a pedestal 141 to a handle 146. An upward-facing ledge 142 extends radially outwardly from a bottom of the pedestal 141. The pedestal 141 is sized to fit within the aperture 126 of the base 120. The ledge 142 has a diameter D2 that is less than the diameter D1 of the aperture 126, but larger than the diameter of the downward-facing ledge 127 at the aperture 126.

The pedestal ledge 142 includes at least one tab 143 extending outwardly from the ledge 142 that is configured to secure the clamp 140 in one or more rotationally fixed positions relative to the base 120 as will be described in more detail herein. In the example shown, two tabs 143 extend from opposite sides of the ledge 142. In other implementations, greater or fewer tabs 143 may extend outwardly from the ledge 142. In some implementations, the tabs 143 are configured to move radially inwardly relative to the pedestal 141. For example, in certain implementations, the tabs 143 are located on flexible arms 145. In certain implementations, a slot 144 is cut into the ledge 142 and/or pedestal 141 behind each flexible arm 145 to provide a space into which the flexible arm 145 may move when flexed.

The example clamp 140 includes at least a first securement section 150 between the pedestal 141 and the handle 146. The first securement section 150 is configured to selectively cooperate with the first tier 130 of cable receiving areas on the base 120 to lock one or more cables 305 into the cable receiving areas. In some implementations, the first securement section 150 includes a first retaining arm 151 that selectively cooperates with the first cable cradle 131 of the first tier 130 of the base 120 to form the first retention arrangement 103 (FIG. 2). In certain implementations, the first securement section 150 also includes a second retaining arm 152 that selectively cooperates with the second cable cradle 132 of the first tier 130 to form the second retention arrangement 105 (FIG. 2).

In some implementations, the first securement section 150 also defines a first cutout region 153 between the pedestal 141 and the first retaining arm 151 and a second cutout region 154 between the pedestal 141 and the second retaining arm 152. In certain implementations, each of the cutout regions 153, 154 define concave channels that are sized to fit partially around cables 305 installed at the respective cable cradles 131, 132. In other implementations, the cutout regions 153, 154 are squared off or otherwise contoured to accommodate the cables 305. In still other implementations, the first securement section 150 does not include cutouts.

In some implementations, the clamp 140 also includes a second securement section 155 located between the first securement section 150 and the handle 146. The second securement section 155 is configured to selectively cooperate with the second tier 134 of cable receiving areas on the base 120 to lock one or more cables 305 into the cable receiving areas. In some implementations, the second securement section 155 includes a first retaining arm 156 that selectively cooperates with the first cable cradle 135 of the second tier 134 of the base 120 to form the third retention arrangement 107 (FIG. 2). In certain implementations, the second securement section 155 also includes a second retaining arm 157 that selectively cooperates with the second cable cradle 136 of the second tier 134 to form the fourth retention arrangement 109 (FIG. 2).

In some implementations, the second securement section 155 also defines a first cutout region 158 and a second cutout region 159. In certain implementations, each of the cutout regions 158, 159 define concave channels that are sized to fit partially around cables 305 installed at the respective cable cradles 135, 136. In other implementations, the cutout regions 158, 159 are squared off or otherwise contoured to accommodate the cables 305. In still other implementations, the second securement section 155 does not include cutouts.

In some implementations, the example clamp 140 includes one or more retaining arrangements 147 that is configured to secure the clamp 140 in one or more axially fixed positions relative to the base 120 as will be described in more detail herein. In certain implementations, the retaining arrangements 147 are located between the first and second securement sections 150, 155. In other implementations, the retaining arrangements 147 can be located elsewhere on the clamp 140. In the example shown, the clamp 140 includes two retaining arrangements 147 facing outwardly from opposite sides of the clamp 140. In the example shown, the retaining arrangement 147 includes an upper lip 148 and a lower lip 149.

Figure 7:
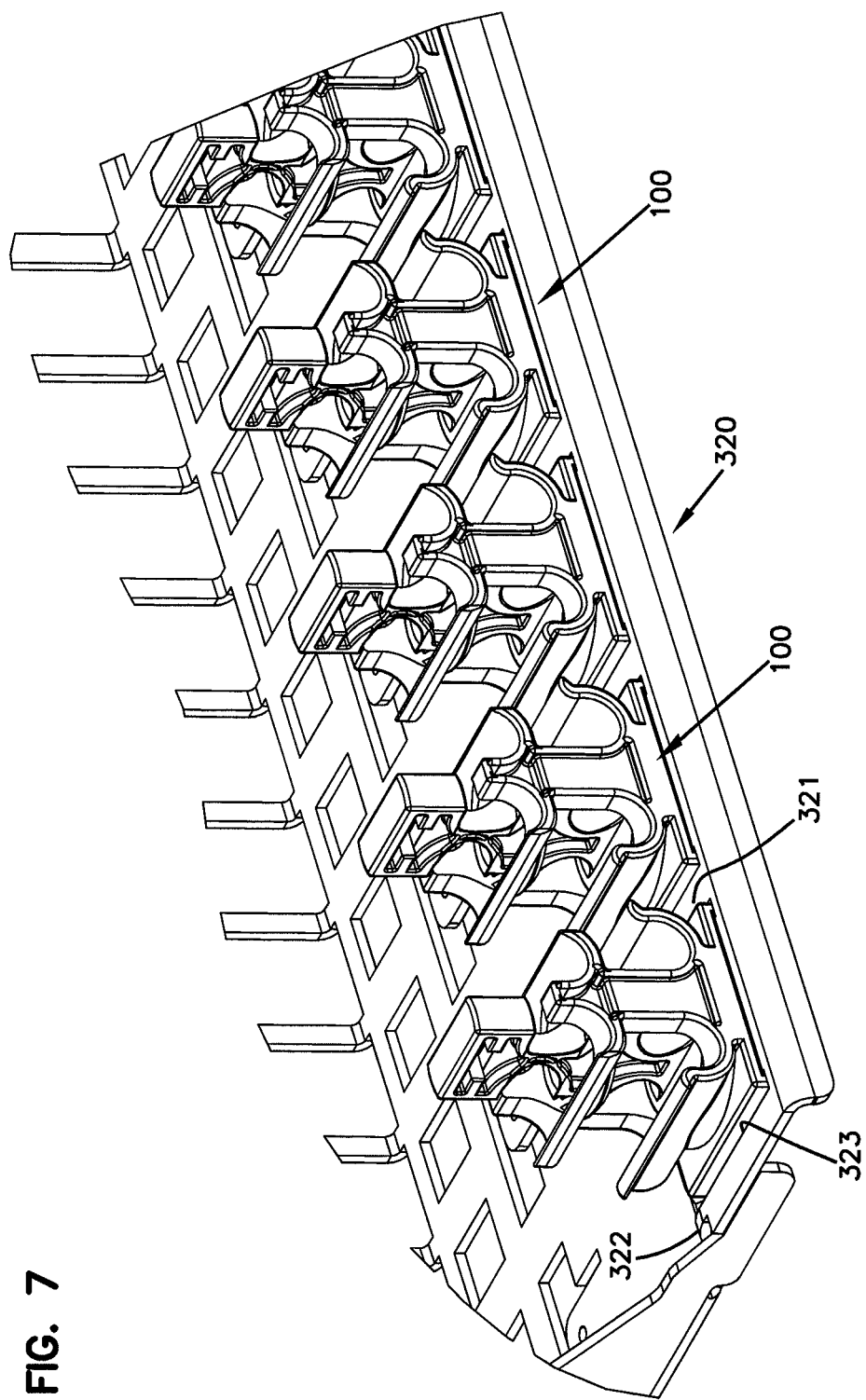
FIG. 7 is a rear perspective view of another portion of the management panel and cable managers of FIG. 1 with the cables removed and the clamps disposed in an open rotational position in accordance with the principles of the present disclosure.
Figure 8:
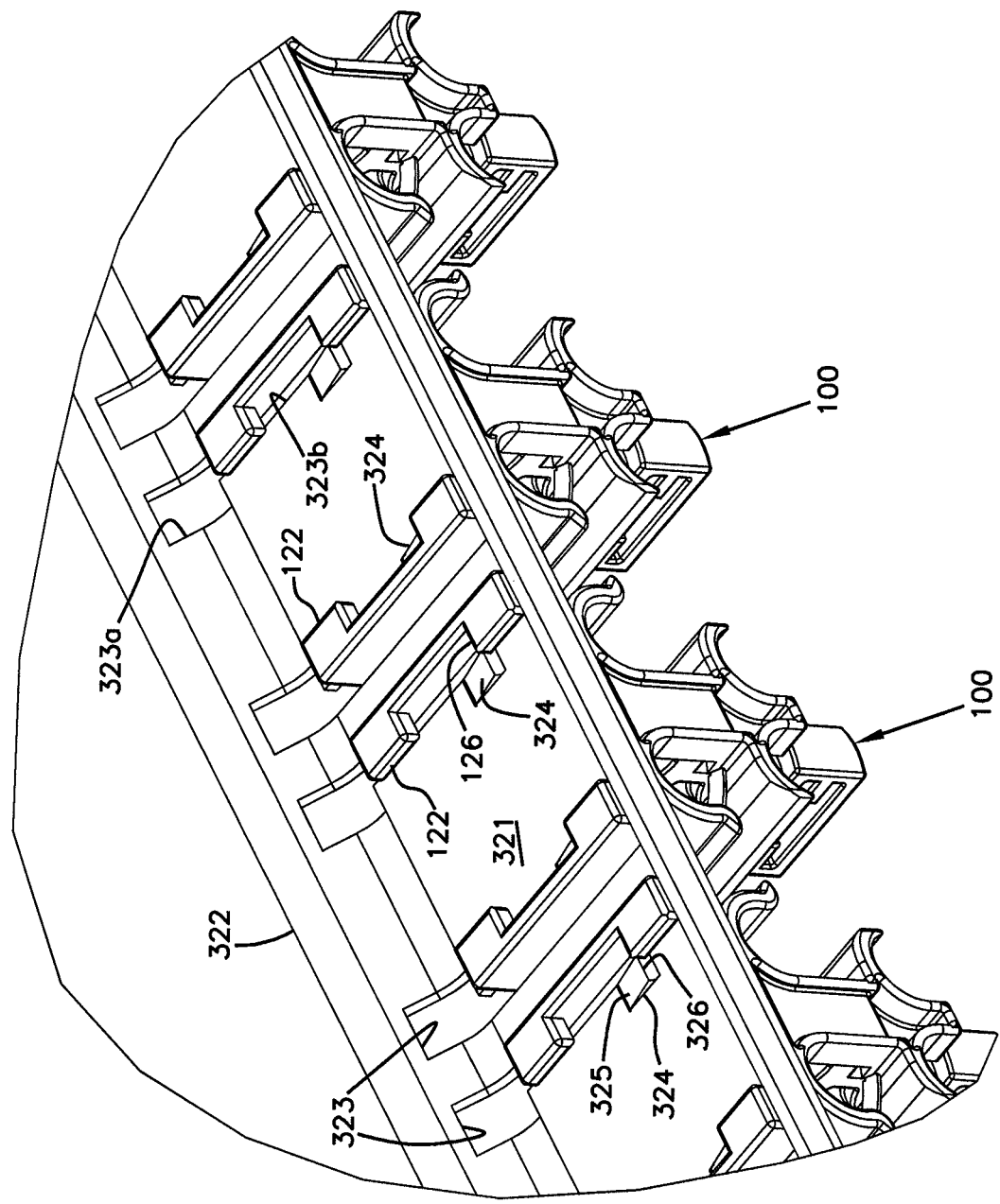
FIG. 8 is a bottom perspective view of the management panel and managers of FIG. 7.
Figure 9:
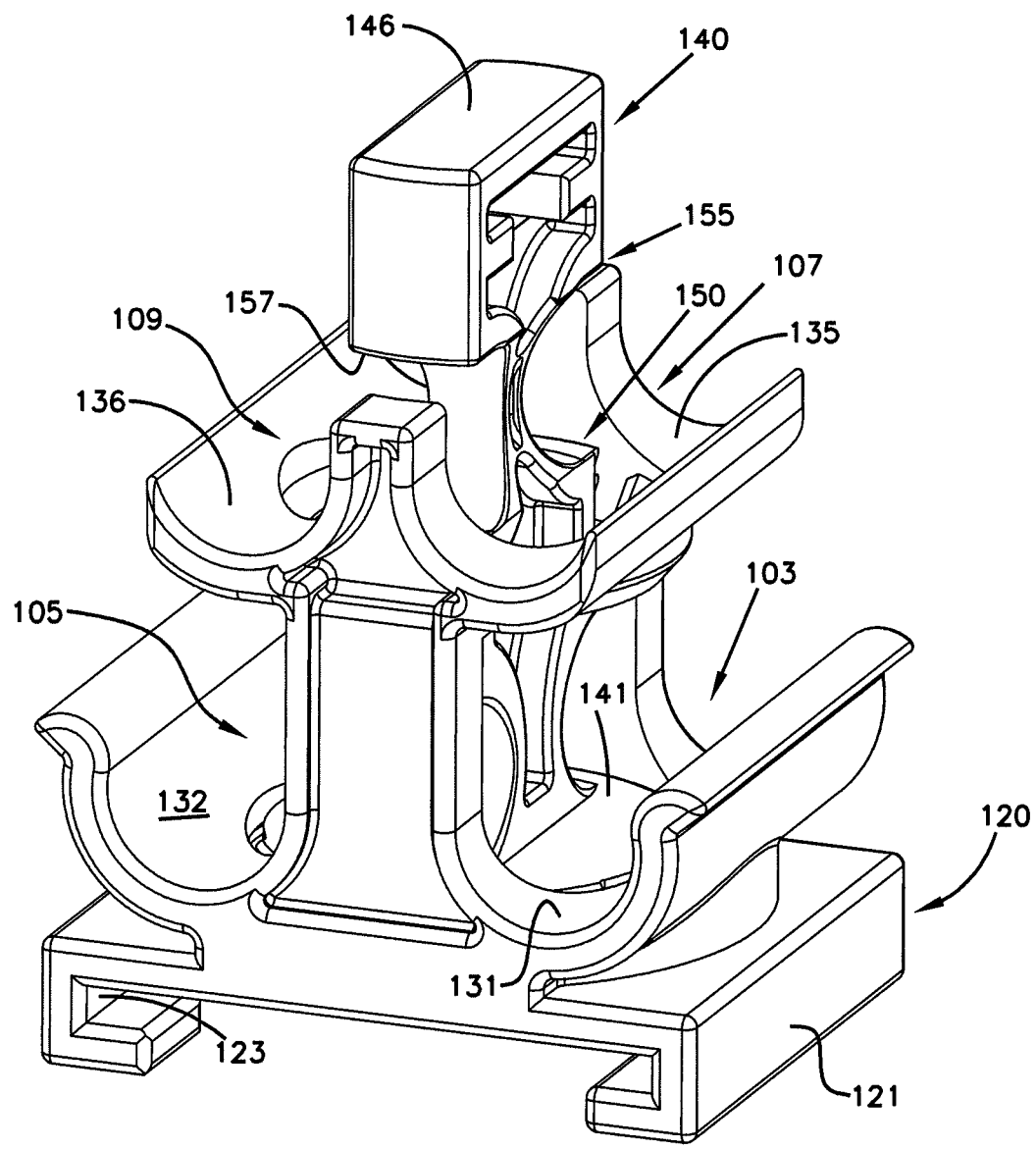
FIG. 9 is a front, top perspective view of the manager of FIG. 2 with the clamp disposed in an open rotational position.
Figure 10:
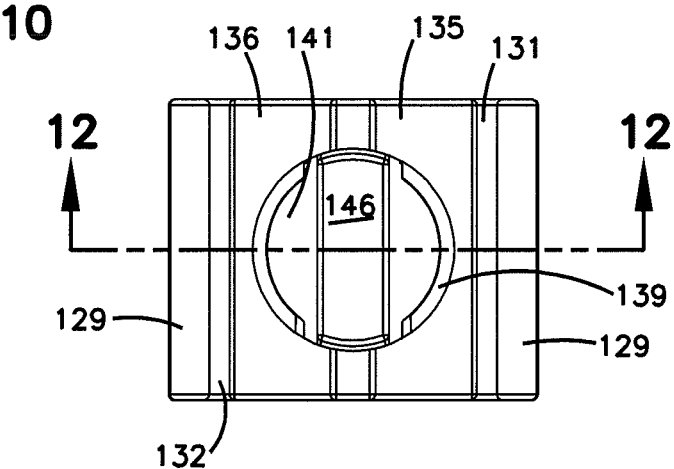
FIG. 10 is a top plan view of the manager of FIG. 9.
Figure 11:
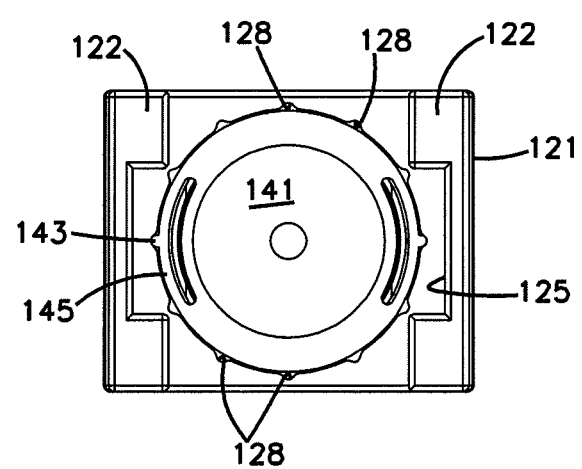
FIG. 11 is a bottom plan view of the manager of FIG. 9.
Figure 12:
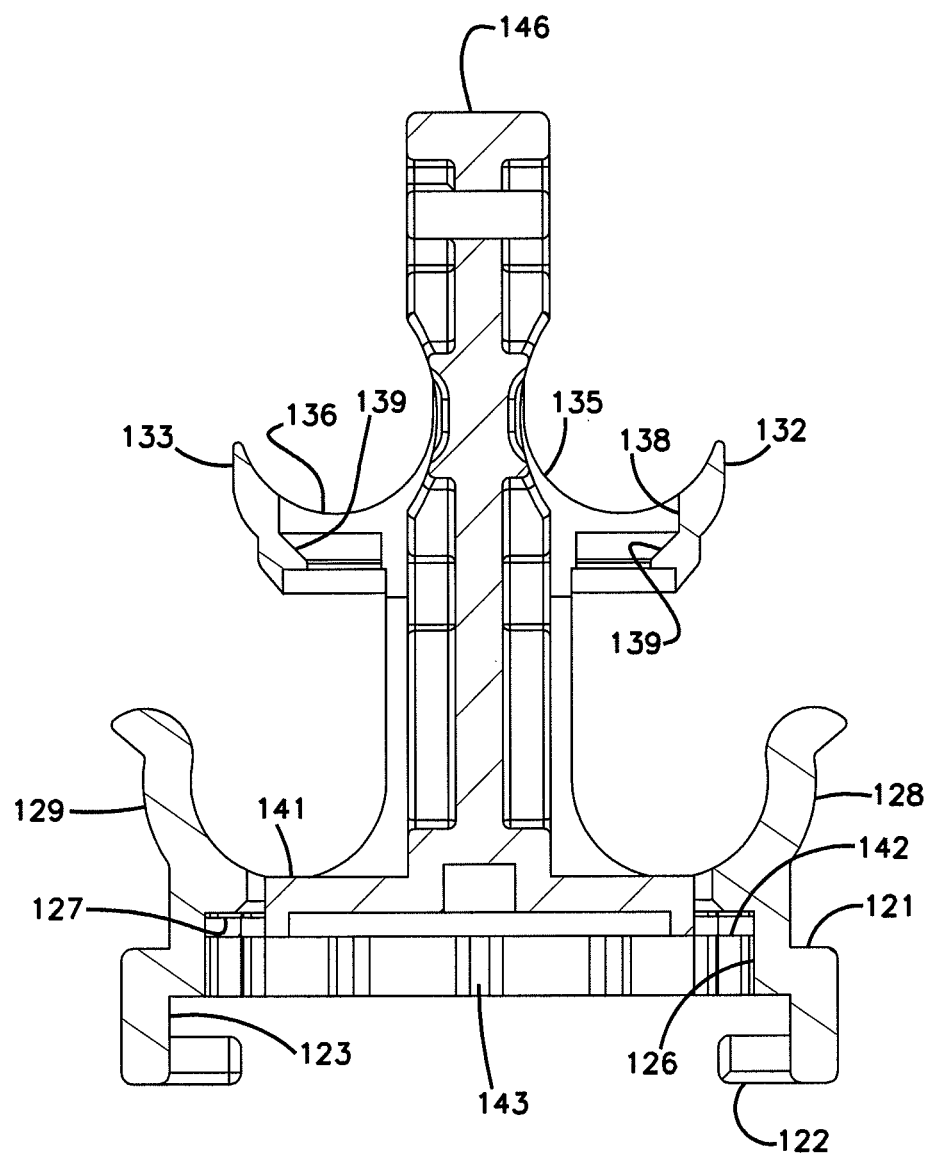
FIG. 12 is a cross-sectional view of the manager of FIG. 9 taken along the cross-section line of FIG. 10.

As shown in FIGS. 7 and 8, the cable manager 100 is mounted to an example management frame 320 by sliding the mount member 121 of the base 120 onto a mounting section 321 of the management frame 320. The mounting section 321 defines parallel slots 323 extending in a forward-rearward direction. In the example shown, the slots 323 are disposed in spaced pairs. As noted above, the mount member 121 includes two spaced guides 122 that define channels 123. The guides 122 are configured to slide rearwardly through the slots 323 of the frame 320 so that edges of the slots 323 pass through the channels 123 defined in the guides 122 as the mount member 121 is slid onto the frame 320.

In some implementations, the mounting section 321 of the management frame 320 includes a forward flange 322 that extends non-planar with the mounting section 321. For example, in certain implementations, the forward flange 322 curves downwardly from the mounting section 321. In certain implementations, the slots 323 also extend at least partially over the forward flange 322. In the example shown, each slot 323 includes a first portion 323a defined in the forward flange 322 and a second portion 323b defined in the mounting section 321.

A cable manager 100 is mounted to the management frame 320 by aligning the guides 122 with the slots 323 of the frame surface 321 so that edges of the mounting section 321 are aligned with the guide channels 123 of the mount member 121. In the example shown, the guides 122 of the mount member 121 are inserted into the first slot portions 323a of the forward flange 322 and slid along the second slot portion 323b of the mounting section 321 when deployed. The guide channels 123 receive the edges of the slots 323 of the mounting section 321.

In some implementations, the cable managers 100 may be latched into place on the management frame 320. For example, in some implementations, the mounting section 321 includes a latching tab 324 defining a ramp 325 and a shoulder 326. In certain implementations, one latching tab 324 is disposed at each pair of slots 323. In other implementations, one latching tab 324 is disposed at each slot 323. In the example shown, a first latching tab 324 is disposed on one side of a first slot 323 and a second latching tab 324 is disposed at an opposite side of the adjacent slot 323.

When a cable manager 100 is deployed, the guides 122 of the cable manager 100 is slid rearwardly through the slots 323 of the frame 320 until the latching tab 324 is disposed within the notch 125 defined in one of the guides 122. In particular, the rear guide portion of the guide 122 cams over the ramp 325 and snaps over the latching tab 324 so that the shoulder 124 of the rear guide portion abuts the shoulder 326 of the latching tab 324. Accordingly, the rear guide portion is held between the latching tab 324 and the rear end of the slots 323.

In accordance with some aspects, the cable manager 100 is mounted to the frame 320 after the clamp 140 is disposed within the base 120. For example, the handle 146 of the clamp 140 can be inserted through the aperture 126 at the bottom 108 of the base 120 and through the second aperture 138 in the base 120 so that the handle 146 extends upwardly past the second tier 134 of cable receiving areas. The pedestal 141 of the clamp 140 fits within the aperture 126 in the base 120. When the cable manager 100 is disposed on the frame 320, the clamp pedestal 141 is disposed between the mounting section 321 of the frame 320 and the downward facing ledge 127 of the mount member 121 of the base 120. Accordingly, the clamp 140 has a limited range of axial movement relative to the base 120 after deployment of the manager 100.

Figure 18:
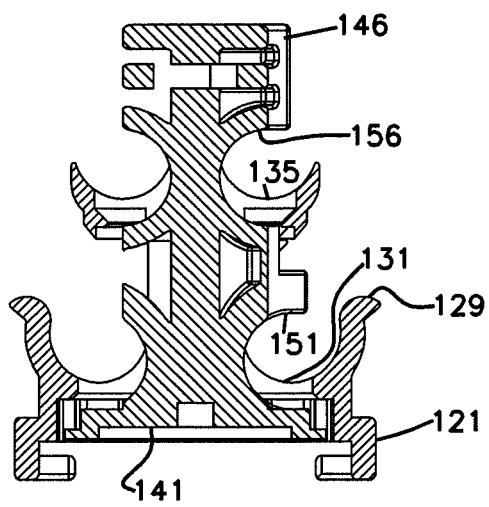
FIG. 18 is a cross-sectional view of the manager of FIG. 16 taken along the cross-section line of FIG. 16.
Figure 19:
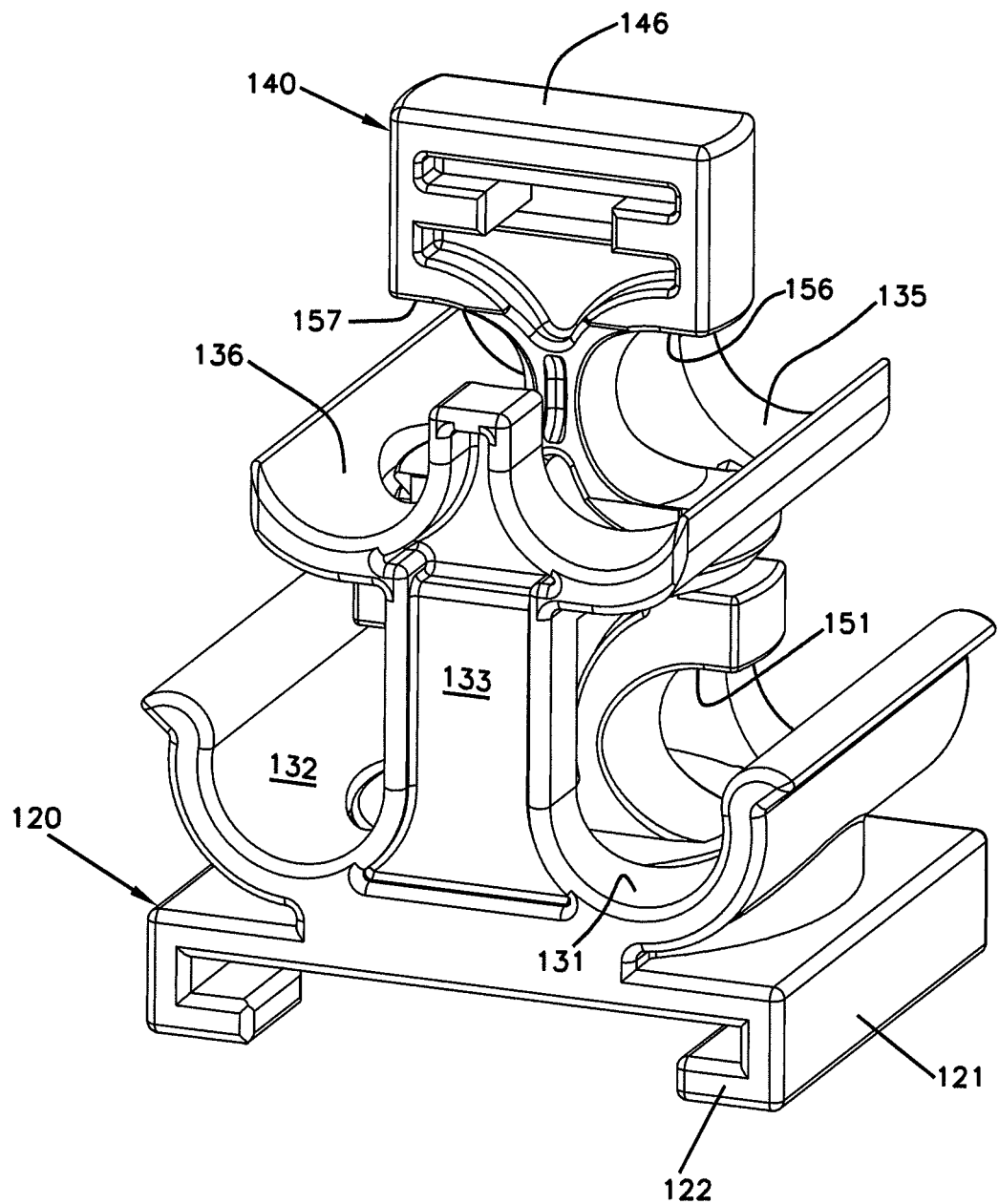
FIG. 19 is a front, top perspective view of the manager of FIG. 9 with the clamp disposed in a closed rotational position.
Figure 20:
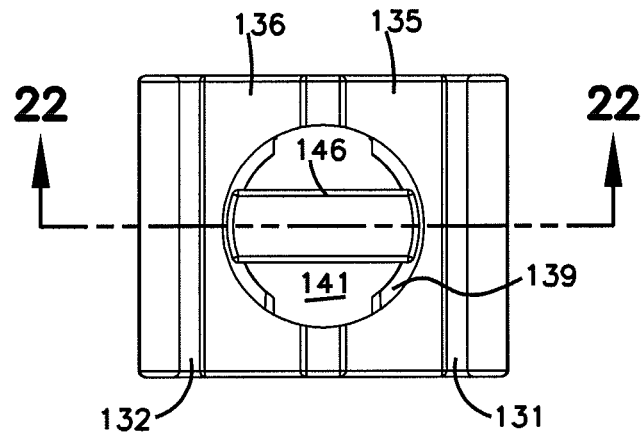
FIG. 20 is a top plan view of the manager of FIG. 19.
Figure 22:
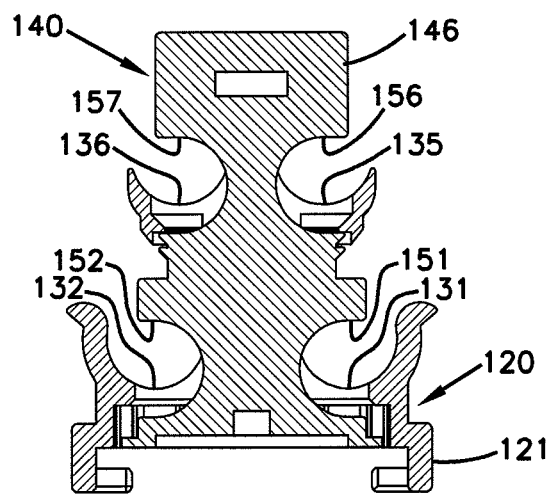
FIG. 22 is a cross-sectional view of the manager of FIG. 19 taken along the cross-section line of FIG. 20.

Referring to FIGS. 9-22, the clamp 140 of the cable manager 100 is configured to rotate relative to the base 120 between an open position (FIG. 9) and a closed position (see FIG. 19). When the clamp 140 is in the open position, the retaining arms 151, 152, 156, 157 do not extend over the cradles 131, 132, 135, 136 of the base 120. Accordingly, the securement sections 150, 155 of the clamp 140 do not inhibit access to the cable receiving areas 103, 105, 107, 109 of the manager 100. Rather, the arms 151,152, 156, 157 extend in the forward-rearward direction. When the clamp 140 is in the closed position, the retaining arms 151,152, 156, 157 of the clamp 140 extend over the cradles 131, 132, 135, 136 of the base 120 to restrict access to the cable receiving areas 103, 105, 107, 109 of the manager 100.

In certain implementations, the base 120 and the clamp 140 include a locking arrangement that rotationally fixes the clamp 140 relative to the base 120. For example, in some implementations, the locking arrangement includes the tabs 143 on the clamp 140 that are each configured to be received in one of the notches 128 defined in the base 120. In certain implementations, the tabs 143 are configured to flex inwardly to enable the clamp 140 to twist relative to the base 120. In the example shown in FIG. 11, the tabs 143 of the pedestal ledge 142 fit in two of the notches 128 cut into an inner circumference of the aperture 126 in the base 120 to secure the clamp 140 in the open position. In other implementations, the clamp 140 has greater or fewer numbers of tabs 143. In certain implementations, the flexible arms 145 bias the tabs 143 into the notches 128. In other implementations, the tabs 143 are stationary relative to the clamp pedestal 141.

A user may rotate the clamp 140 by twisting the handle 146 of the clamp 140. In some implementations, the tabs 143 flex inwardly out of the notches 128 and ride along the circumference of the aperture 126 as the pedestal 141 rotates. In such implementations, the tabs 143 extend outwardly into the notches 128 automatically when the tabs 143 are aligned with the notches 128. In other implementations, the tabs 143 are rigid. In such implementations, the user may slide the clamp 140 axially to remove the tabs 143 from the notches, twist the clamp 140 a desired amount, and slide the clamp 140 back into the position so that the tabs 143 fit into the appropriate notches 128. For example, a user may lift the clamp 140 to raise the tabs 143 out of a first set of notches 128, rotate the clamp 140 so that the tabs 143 align with a different set of notches 128, and lower the clamp 140 to fit the tabs 143 in the notches 128 and lock the clamp 140 into a rotational position.

Figure 13:
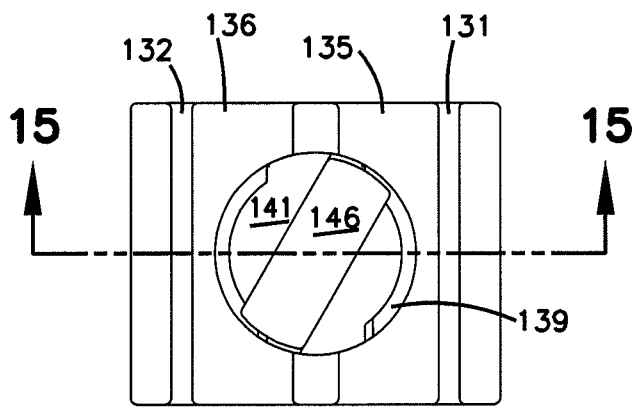
FIG. 13 is a top plan view of the manager of FIG. 9 with the clamp rotated to a different rotational position.
Figure 14:
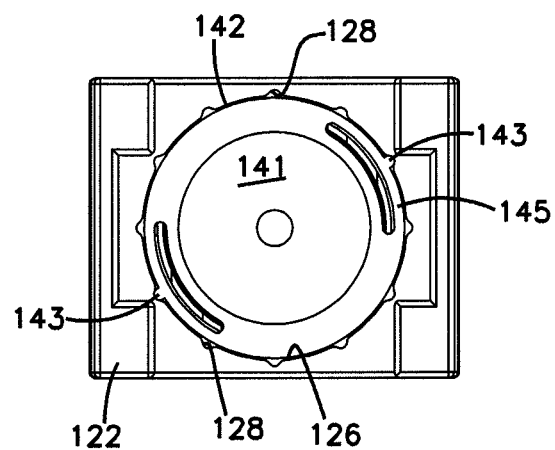
FIG. 14 is a bottom plan view of the manager of FIG. 13.
Figure 15:
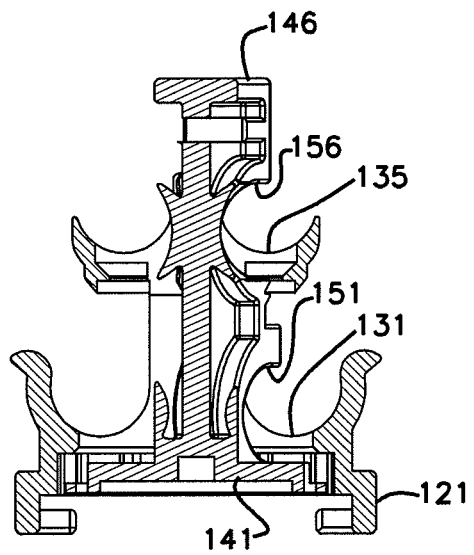
FIG. 15 is a cross-sectional view of the manager of FIG. 13 taken along the cross-section line of FIG. 13.
Figure 16:
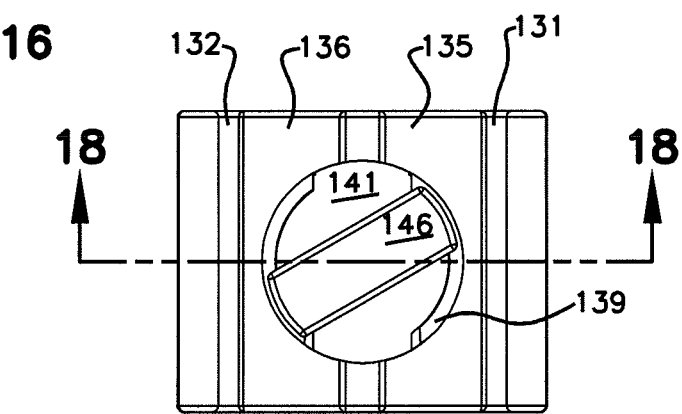
FIG. 16 is a top plan view of the manager of FIG. 13 with the clamp rotated to another rotational position.
Figure 17:
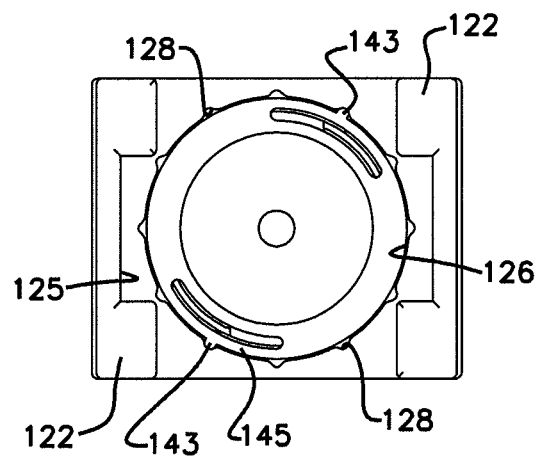
FIG. 17 is a bottom plan view of the manager of FIG. 16.
Figure 21:
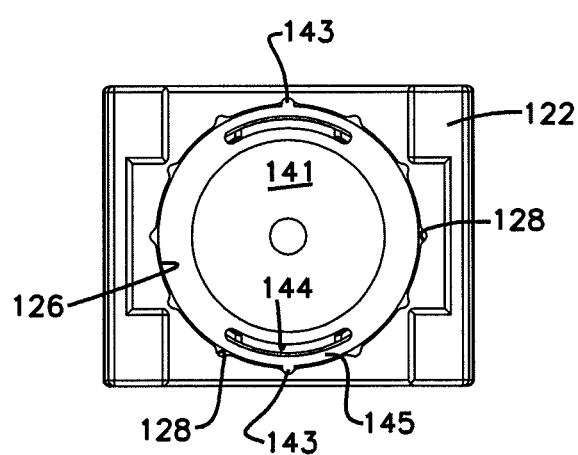
FIG. 21 is a bottom plan view of the manager of FIG. 19.

In certain implementations, the locking arrangement may lock the clamp 140 into any of a plurality of rotational positions relative to the base 120. For example, FIGS. 13-15 show the clamp 140 twisted so that the tabs 143 have been moved over one notch 128 along the circumference of the aperture 126 from the open position. The retaining arms 151,152, 156, 157 of the clamp 140 are disposed so as to extend partially over the cradles 131, 132, 135, 136 of the base 120. FIGS. 16-18 show the clamp 140 twisted so that the tabs 143 have been moved over two notches 128 along the circumference of the aperture 126 from the open position. The retaining arms 151,152, 156, 157 of the clamp 140 in FIG. 18 extend farther out over the cradles 131, 132, 135, 136 as compared to the clamp 140 in FIG. 15. FIGS. 19-22 illustrate the clamp 140 disposed in the closed position relative to the base 120. As shown in FIG. 21, the tabs 143 are disposed in the notches 128 that face forward and rearward relative to the base 120.

Referring to FIGS. 23-29, the cable manager 100 is configured to receive and manage cables having various diameters. For example, the clamp 140 is configured to move axially relative to the base 120 along the axis of rotation AR. Moving the clamp 140 relative to the base 120 adjusts the sizing of the cable receiving areas 103, 105, 107, 109. For example, moving the clamp 140 relative to the base 120 adjusts the spacing between the cable cradles 131, 132, 135, 136 of the base 120 and the securement sections 150, 155 of the clamp 140.

Figure 23:
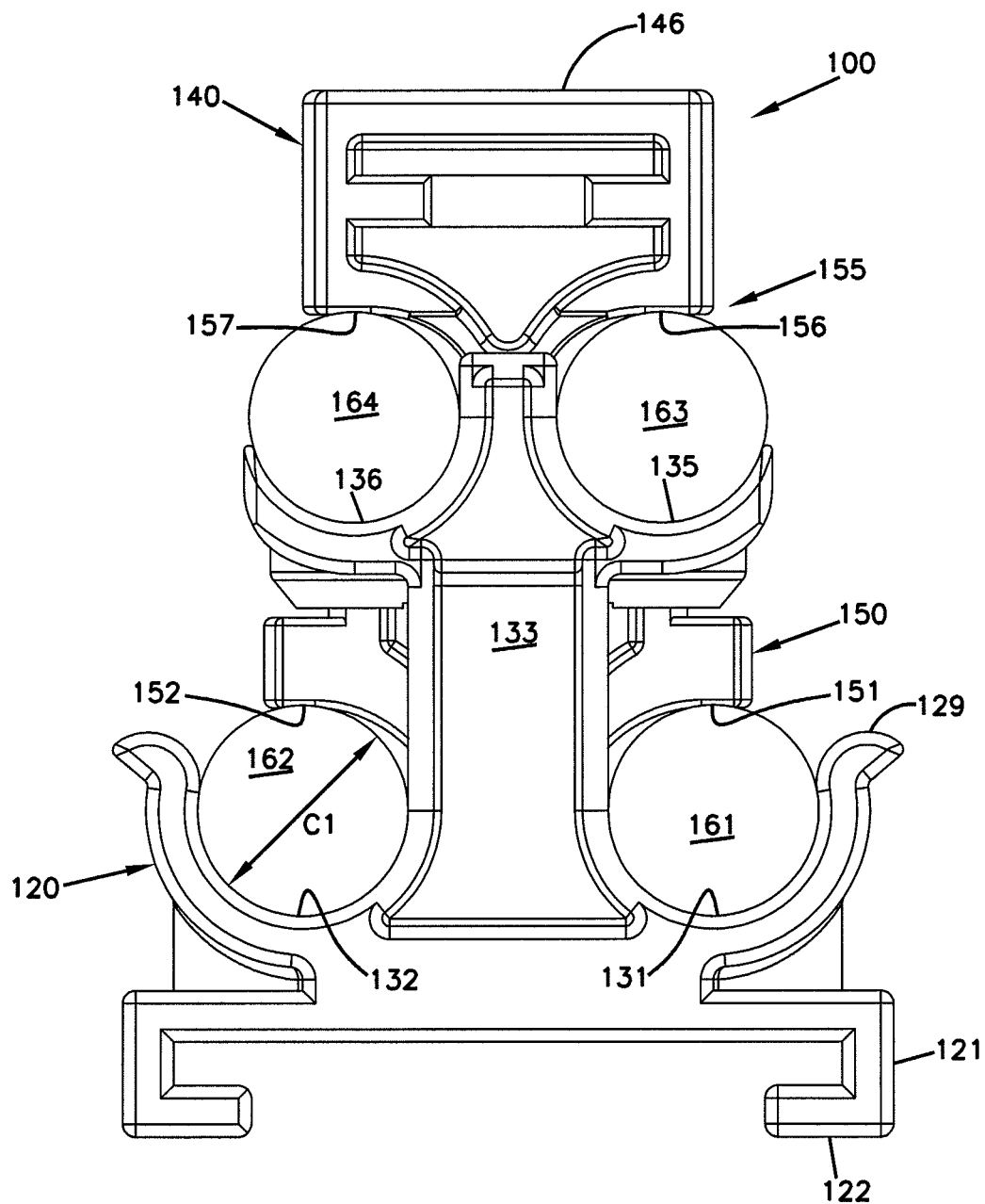
FIG. 23 is a front elevational view of the manager of FIG. 19 with four cables of a first diameter disposed in cable receiving areas of the cable manager.

FIG. 23 is a front elevational view of an example cable manager 100 holding four cables 161-164. In the example shown, each of the cables 161-164 has a first diameter C1. The clamp 140 is axially disposed relative to the base 120 to accommodate the first diameter C1 between the cradles 131, 132, 135, 136 and the retaining arms 151, 152, 156, 157, respectively. In other implementations, however, the cables 161, 162 disposed in the first tier 130 of cable receiving areas may have a different diameter than the cables 163, 164 disposed in the second tier 134 of cable receiving areas.

Figure 24:
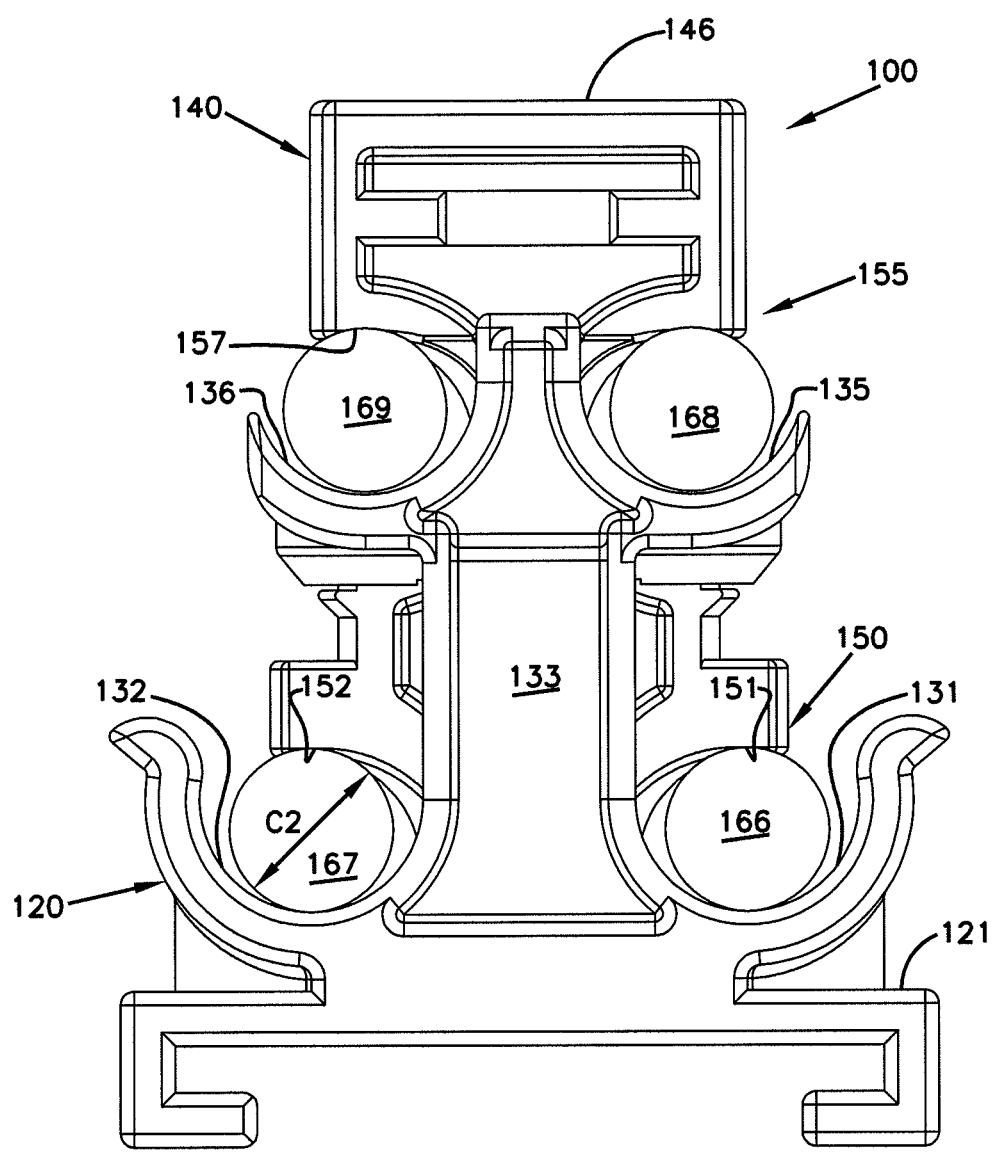
FIG. 24 is a front elevational view of the manager of FIG. 19 with four cables of a second, smaller diameter disposed in cable receiving areas of the cable manager in accordance with the principles of the present disclosure.

FIG. 24 is a front elevational view of the cable manager 100 of FIG. 23 holding four cables 166-169 that are smaller than cables 161-164. In the example shown, each of the cables 166-169 has a second diameter C2 that is less than the first diameter C1. The clamp 140 is axially disposed relative to the base 120 to accommodate the second diameter C2 between the cradles 131, 132, 135, 136 and the retaining arms 151, 152, 156, 157, respectively. In other implementations, however, the cables 166, 167 disposed in the first tier 130 of cable receiving areas may have a different diameter than the cables 168, 169 disposed in the second tier 134 of cable receiving areas.

Figure 25:
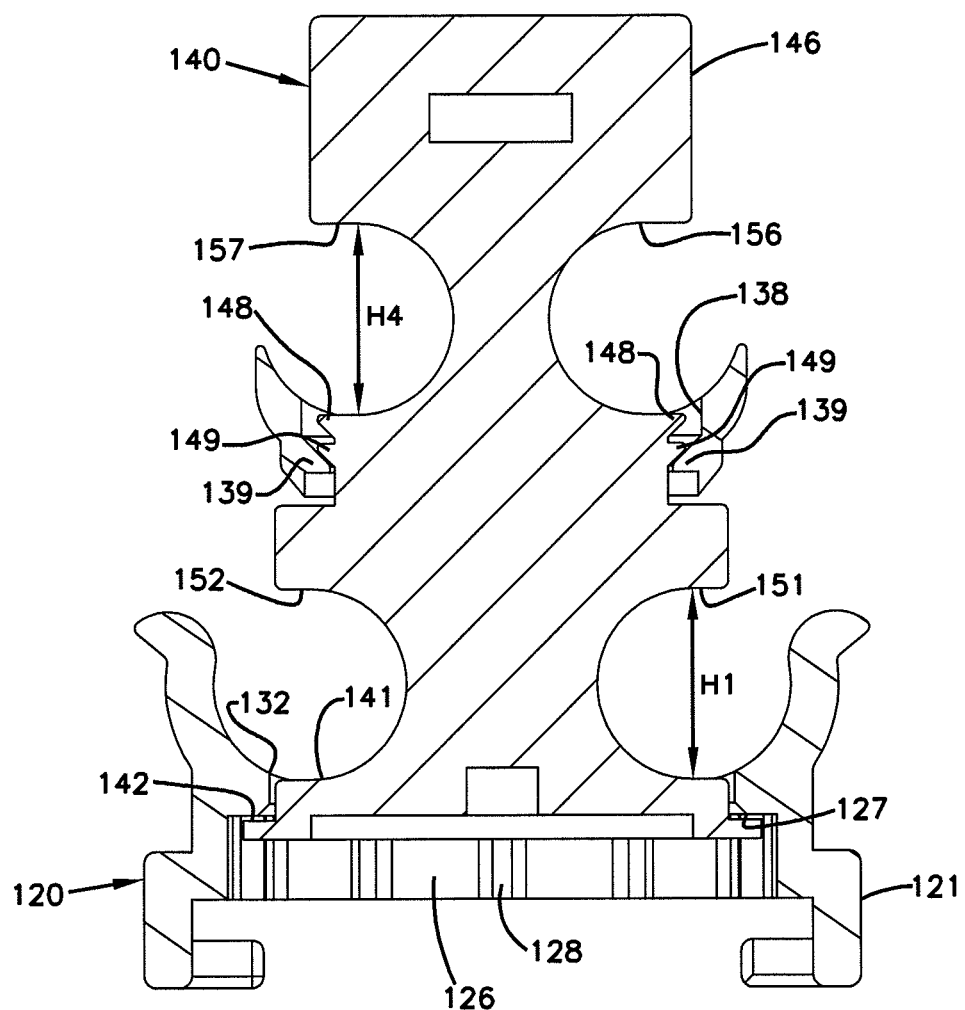
FIG. 25 is a cross-sectional view of the manager of FIG. 23 with the clamp disposed in a first axial position with the cables removed.
Figure 26:
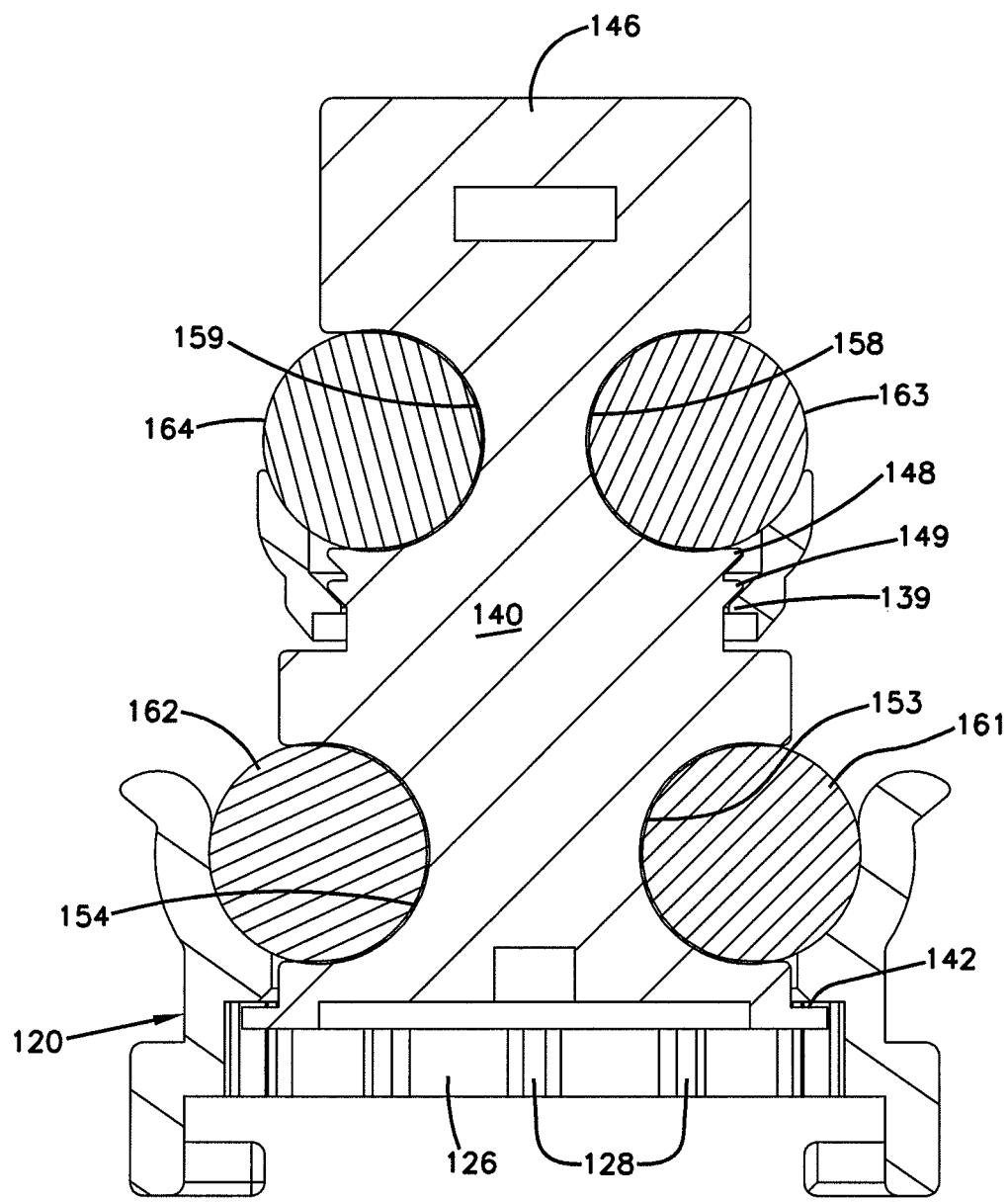
FIG. 26 is a cross-sectional view of the manager retaining cables of a first diameter.
Figure 27:
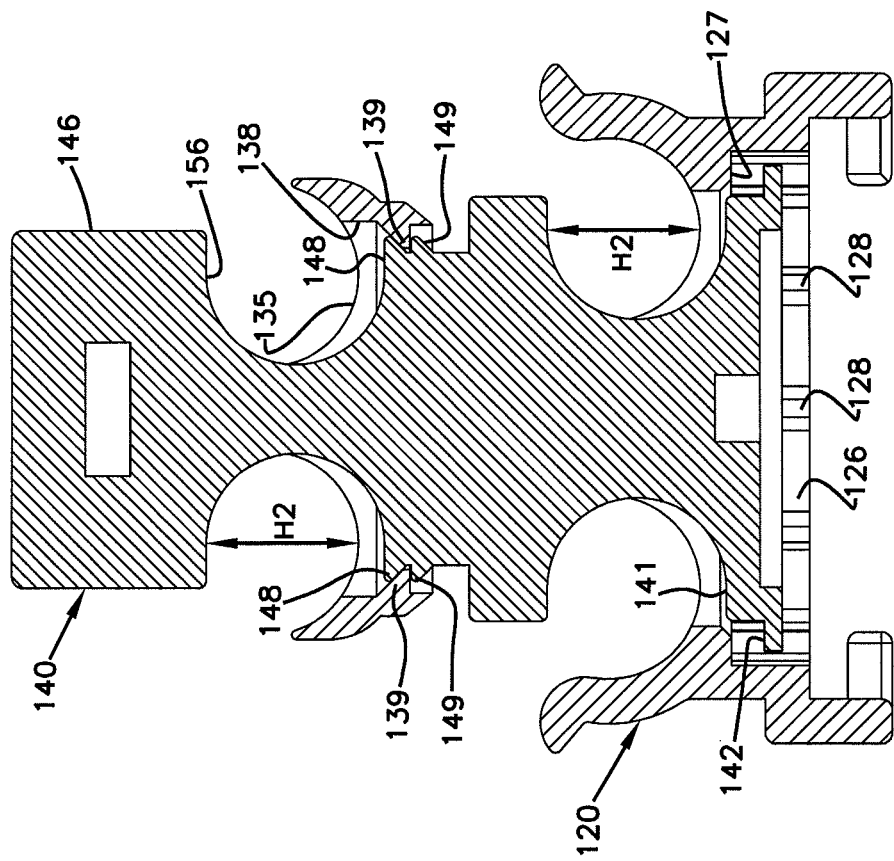
FIG. 27 is a cross-sectional view of the manager of FIG. 25 with the clamp disposed in a second, lower axial position.
Figure 28:
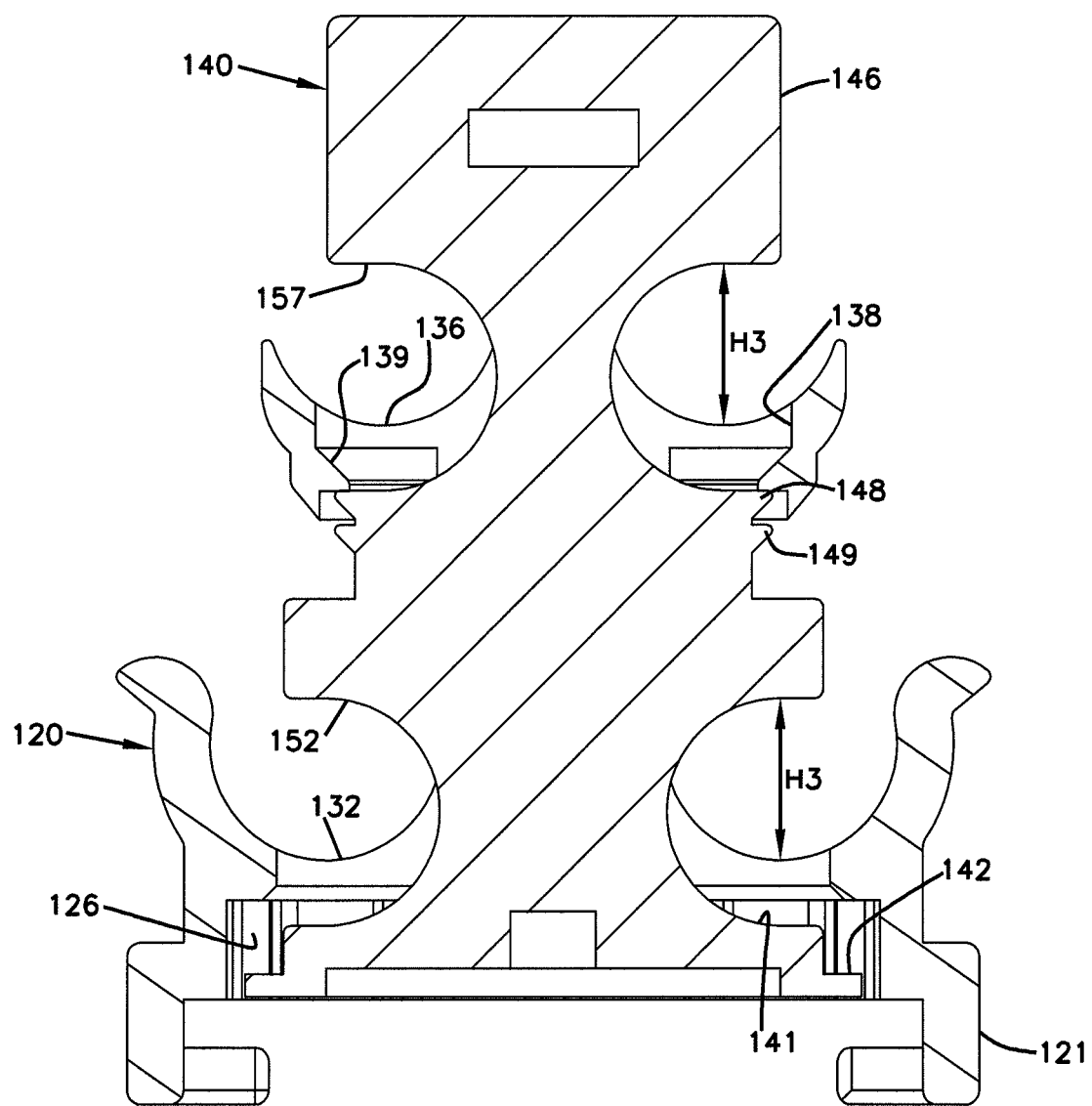
FIG. 28 is a cross-sectional view of the manager of FIG. 25 with the clamp disposed in a third, lower axial position.
Figure 29:
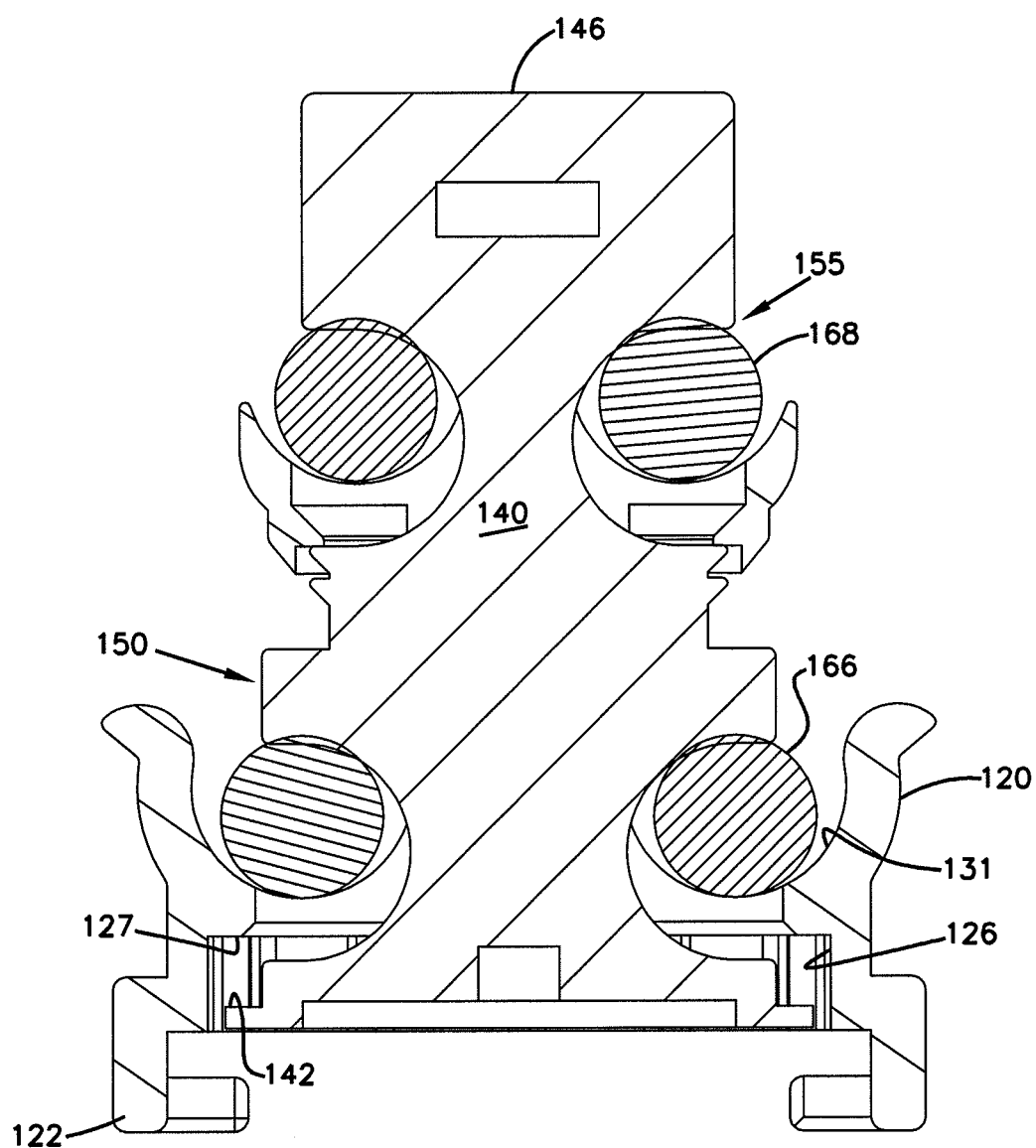
FIG. 29 is a cross-sectional view of the manager retaining cables of a second, smaller diameter.
Figure 36:
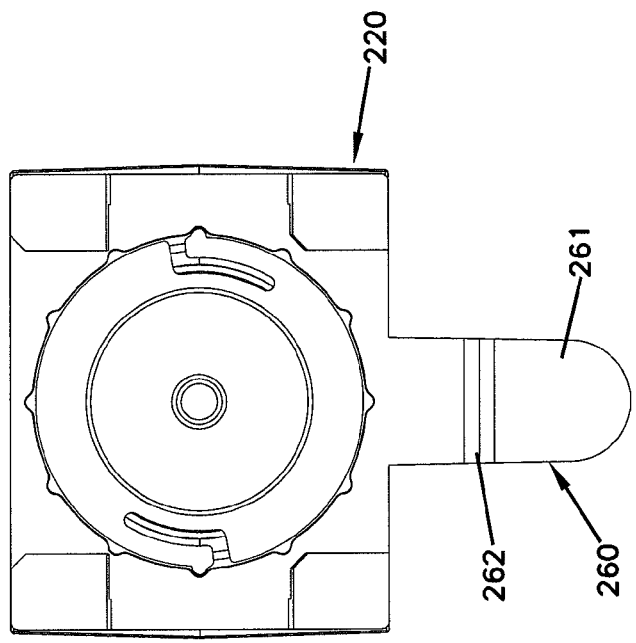
FIG. 36 is a bottom plan view of the cable manager of FIG. 30.
Figure 30:
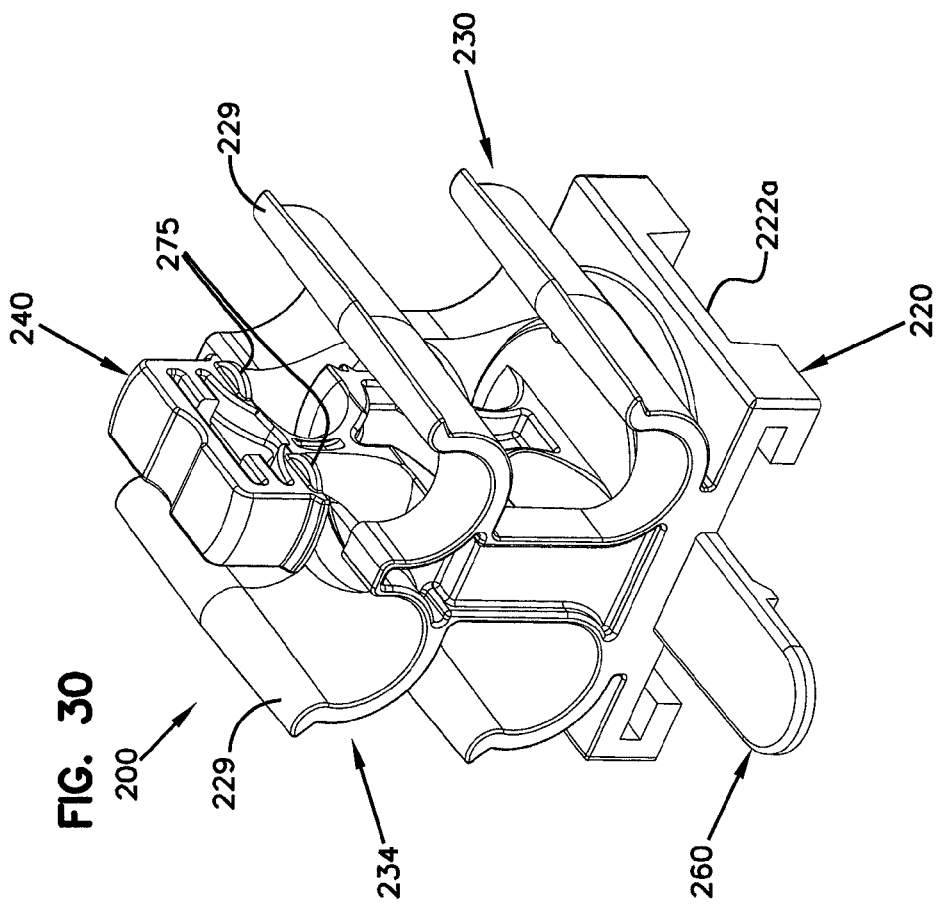
FIG. 30 is a top perspective view of another example implementation of a cable manager including an example base and an example clamp disposed in an open position.

FIGS. 25-29 are cross-sectional views of the cable manager 100 showing the clamp 140 disposed in various axial positions relative to the base 120 while in the rotationally closed position. As the clamp 140 moves axially, the upward-facing ledge 142 of the clamp pedestal 141 moves within the aperture 126 of the base 120. For example, the notches 128 have sufficient height to accommodate the axial movement of the tabs 143 disposed on the pedestal 141. FIG. 25 shows the clamp 140 disposed in a first axial position relative to the base 120; FIG. 27 shows the clamp 140 disposed in a second axial position; and FIG. 29 shows the clamp 140 disposed in a third axial position.

In the first axial position, the bottoms of the cutout regions 153, 154, 158, 159 are about level with the cable cradles 131, 132, 135, 136 of the base 120. Accordingly, the cutout regions 153, 154, 158, 159 of the clamp 140 are fully exposed. When the cutout regions 153, 154, 158, 159 are fully exposed, the cable manager 100 can receive cable having a diameter about equal to a distance H1 between the top and bottom of the cutouts 153, 154, 158, 159 (see FIG. 26). In other implementations, the bottoms of the cutout regions 153, 154, 158, 159 are disposed below the cable cradles 131, 132, 135, 136 when the clamp 140 is in the upper-most axial position. In such implementations, the distance between the retaining arms 151, 152, 156, 157 and the cable cradles 131, 132, 135, 136 defines the maximum cable diameter that may be received by the manager 100.

The upward-facing ledge 142 of the clamp pedestal 141 is disposed at the downward-facing ledge 127 of the base 120. The downward ledge 127 of the base 120 blocks the upward ledge 142 of the clamp 140 from passing completely through the aperture 126. In certain implementations, the first securement section 130 may abut the second tier 134 of cable receiving areas. Accordingly, the first securement section 130 also may inhibit the clamp 140 from passing completely through the base 120 in an upward direction.

In the second axial position, the retaining arms 151, 152, 156, 157 are disposed closer to the respective cradles 131, 132, 135, 136 than in the first axial position. In the example shown, the bottoms of the cutout regions 153, 154, 158, 159 are located below the respective cradles 131, 132, 135, 136 of the base 120. In the example shown, the retaining arms 151, 152, 156, 157 are spaced a distance H2 from the respective cradles 131, 132, 135, 136. The distance H2 is less than the distance H1. The upward-facing ledge 142 of the clamp 140 is spaced downwardly from the downward-facing ledge 127 of the base 120 at an intermediate position along the height of the aperture 126.

In the third axial position, the retaining arms 151, 152, 156, 157 are disposed closer to the respective cradles 131, 132, 135, 136 than in the second axial position. In the example shown, the retaining arms 151, 152, 156, 157 are spaced a distance H3 from the respective cradles 131, 132, 135, 136. The distance H3 is less than the distance H2, which is less than the distance H1. The upward-facing ledge 142 of the clamp 140 is disposed at the bottom of the aperture 126. In the example shown, the entire clamp pedestal 141 is disposed within the aperture 126 of the base 120 when the clamp 140 is in the third axial position.

In accordance with some implementations, the base 120 and the clamp 140 include a retention arrangement that holds the clamp 140 in at least one axially fixed position. In certain implementations, the retention arrangement is configured to hold the clamp 140 in multiple axially fixed positions relative to the base 120. For example, in some implementations, the retention arrangement includes a first retaining arrangement 139 extending inwardly from the base 120 and a second retaining arrangement 147 extending outwardly from clamp 140. In certain implementations, the base 120 includes two first retaining arrangements 139 disposed on opposite sides of the base 120 and the clamp 140 includes two retaining arrangements 147 disposed on opposite sides of the clamp 140. The first retaining arrangement 139 interacts with the second retaining arrangement 147 to secure the clamp 140 into one or more axially fixed positions relative to the base 120.

In certain implementations, the first retaining arrangement 139 includes a lip or ratchet tooth extending inwardly from opposite sides of the second aperture 138 of the base 120. The second retaining arrangement 147 includes an upper lip or ratchet tooth 148 and a lower lip or ratchet tooth 149 extending outwardly from opposite sides of the clamp 140. In the example shown, the lip 139 ramps downwardly and the lips 148, 149 ramp upwardly. In other implementations, the lip 139 may ramp upwardly and the lips 148, 149 may ramp downwardly. In still other implementations, the first retaining arrangement 139 and the second retaining arrangement 147 may include a greater or lesser number of lips or teeth.

In some implementations, the lips/ratchet teeth 139 each extend over a portion of the circumference of the second aperture 138 of the base 120. In certain implementations, each lip/tooth 139 extends over more than a quarter and less than half of the circumference. In some implementations, the lips/teeth 148, 149 each extend across one side of the clamp 140. In the example shown, the first retaining arrangement 139 aligns with the second retaining arrangement 147 when the clamp 140 is in the closed position. The first retaining arrangement 139 does not align with the second retaining arrangement 147 when the clamp 140 is in the open position. In other implementations, however, the first and second retaining arrangements 139 may be configured to interact when the clamp 140 is disposed in the open position.

In the first axial position, the lower lips 149 of the clamp 140 are disposed on top of the lips 139 of the base 120. The lips 139, 149 are sized so that the upward ramps of the lower lips 149 abut the downward ramps of the lips 139. The lips 139, 149 are sufficiently rigid to enable the lips 139, 149 to support the clamp 140 in the first axial position relative to the base 120. The upward-facing ledge 142 of the pedestal 141 abuts the downward-facing ledge 127 of the base 120 to inhibit the clamp 140 from being pulled completely through the base 120.

In the second axial position, the lips 139 of the base 120 fit in grooves between the upper and lower lips 148, 149 of the clamp 140. The upward ramps of the upper lips 148 abut the downward ramps of the lips 139. The lips 139, 148 are sufficiently rigid to enable the lips 139, 148 to support the clamp 140 in the second axial position relative to the base 120.

In the third axial position, the upper lips 148 of the clamp 140 are disposed beneath the lips 139 of the base 120. The bottom of the clamp 140 is disposed at the bottom of the aperture 126. When the cable manager 100 is mounted to the frame 320, the bottom of the clamp 140 seats on the top surface of the mounting section 321 of the frame 320. Accordingly, the mounting section 321 inhibits the clamp 140 from passing through the bottom of the base 120.

At least one of the retaining arrangements 139, 147 is sufficiently flexible to enable the lips 139 to pass over the lower lips 149 and into grooves between the upper and lower lips 148, 149 when a user pushes downwardly on the clamp 140. In one implementation, the lips 148, 149 of the clamp 140 are more flexible than the lips 139 of the base 120. In another implementation, the lips 148, 149 of the clamp 140 are less flexible than the lips 139 of the base 120. In another implementation, the lips 148, 149 of the clamp 140 are about as flexible as the lips 139 of the base 120.

FIGS. 30-40 illustrate another example implementation of a cable manager 200 suitable for use with a communications panel, such as communications panel 300 of FIG. 1. The cable manager 200 includes a base 220 and a clamp 240 that cooperate to form cable receiving areas. The clamp 240 is moveable relative to the base 220 between an open position (see FIG. 30) and a closed position (FIG. 37) to enable cables to be loaded and secured, respectively. In certain implementations, the clamp 240 rotates relative to the base 220 between the open and closed positions.

In general, the base 220 shown in FIGS. 31 and 32 is substantially the same as the base 120 described above, except for a few modifications described herein. In the example shown, each of the cable cradles 231, 232, 235, 236 of the base 220 (i.e., both tiers 230 and 234) defines a concave edge 229 that facilitate insertion of a cable (e.g., cable 305) into the cradle. Guides 222 are formed at opposite sides of the mount member 221. As shown in FIG. 32, one or both the guides 222 may define a recess 222a that separate the guides into four sections. The recesses 222a facilitate mounting the base 220 to a panel as will be disclosed in more detail herein.

Also, the base 220 includes a retention tab 260 that extends outwardly from the mount member 221 at one side of the manager 200. The retention tab 260 includes an arm 261 that extends from the mount member 221 to a free end. A latch arrangement 262 is disposed on the arm 261 facing downwardly relative to the base 220. The latch arrangement 262 includes a cam surface facing the rest of the base 220 and a shoulder 264 facing away from the rest of the base 220. The arm 261 flexes in an upward-downwardly direction to enable the latch arrangement to releasably secure the base 220 to a panel as will be described in more detail herein.

The clamp 240 shown in FIGS. 33-35 is substantially the same as the clamp 140 described above, except for a few modifications described herein. The clamp 240 extends between a handle 246 and a pedestal 241. The handle 246 of the clamp 240 defines a depression 246a. The depression 246a protects the user from pressing a finger against a pit that may form during manufacturing of the clamp 240.

The clamp 240 is configured to be axially inserted into the base 220 by inserting the handle 246 through the aperture (see aperture 126 of FIG. 4) defined in the mount member 221. The clamp 240 is inserted in the open rotational position. The clamp 240 includes retention lips 270 at opposite sides of the handle 246. The retention lips 270 are sized and positioned to compress against the interior of the base 220 and to snap over the top of the base 220 (e.g., see surface 137 of FIG. 31) when the clamp 240 is inserted into the base 220. Engagement between the retention lips 270 and the base inhibits the clamp 240 from moving back out of the bottom of the base 220 even when the base 220 is not mounted to a frame 300 and/or cables are not disposed in the cable cradles 231, 232, 235, 236. As with clamp 140, the upper and lower lips (e.g., lips 147, 149) of clamp 240 engage the ratchet teeth of the base 220 (e.g., see ratchet teeth 139) to retain the clamp 240 within the base 220 when the clamp 240 has been rotated to the closed position.

Figure 37:
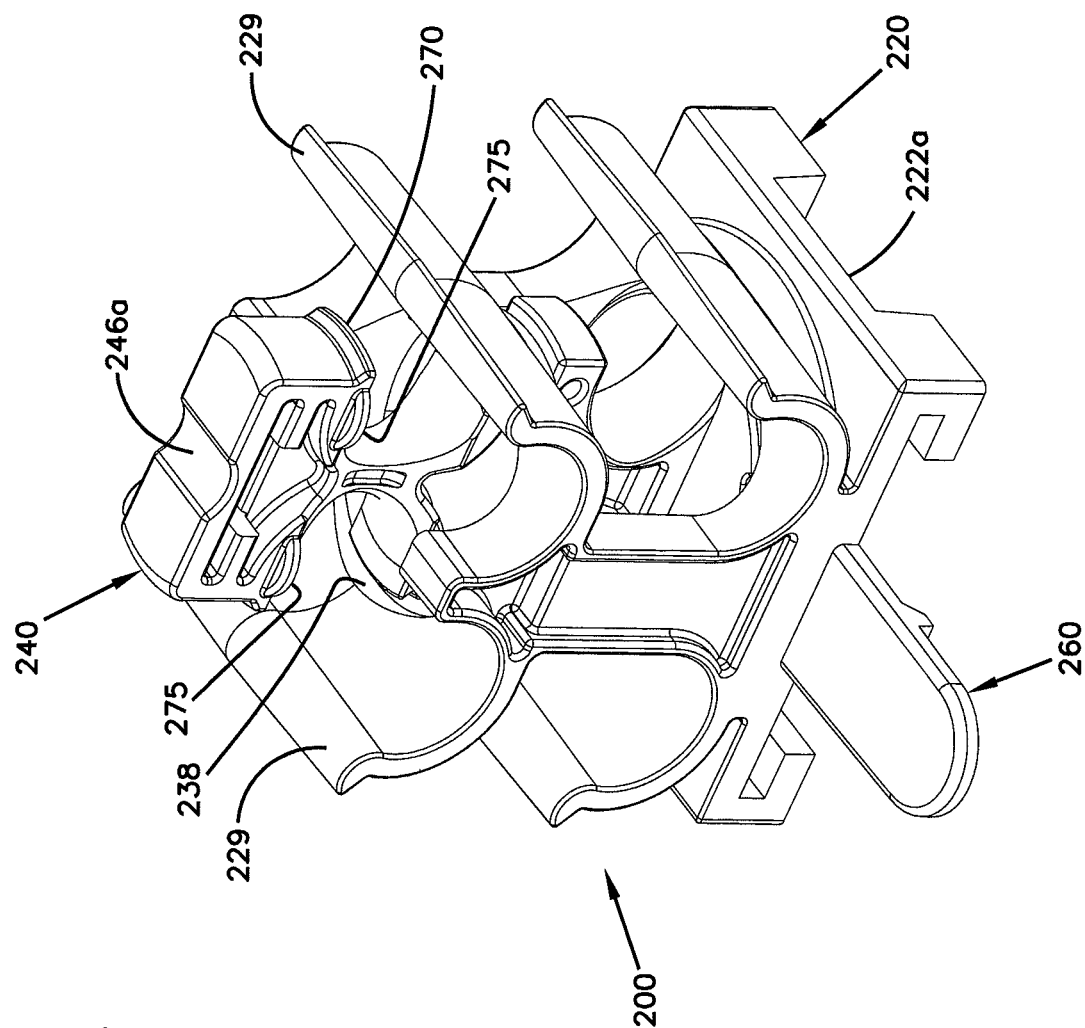
FIG. 37 is a top perspective view of the manager of FIG. 30 with the clamp disposed in the closed position.

The clamp 240 also includes retaining tabs 275 that extend outwardly from the handle 246. In certain implementations, the retaining tabs 275 extend outwardly from the major surfaces of the handle 246. Accordingly, the retaining tabs 275 extend towards the edges 229 of the cable cradles 231, 232, 235, 236 of the base 220 when the clamp 240 is disposed in the open position (FIG. 30) and extend towards and away from the retention tab 260 of the base 220 when the clamp 240 is disposed in the closed position (FIG. 37). The retaining tabs 275 aid in retaining cables in the top tier cradles 235, 236 when the clamp 240 is in the open position.

As shown in FIG. 35, a pedestal ledge 242 of the clamp 240 includes at least one tab 243 extending outwardly from the ledge 242 that is configured to secure the clamp 240 in one or more rotationally fixed positions relative to the base 220. In the example shown, two tabs 243 extend from opposite sides of the ledge 242. In other implementations, a greater or lesser number of tabs 243 may extend outwardly from the ledge 242. In some implementations, the tabs 243 are configured to move radially inwardly relative to the pedestal 241. For example, in certain implementations, each tab 243 is located on a flexible arm 245. In certain implementations, the arm 245 is radially offset from the pedestal 241 to provide a space 244 into which the flexible arm 245 may move when flexed.

The tabs 243 on the clamp 240 are each configured to be received in one of a plurality of notches defined in the base 120 (e.g., see notches 128 in FIG. 4). In certain implementations, the tabs 243 are configured to flex inwardly to enable the clamp 240 to twist relative to the base 220. A user may rotate the clamp 240 by twisting the handle 246 of the clamp 240 relative to the base 220. In some implementations, the tabs 243 flex inwardly out of the notches and ride along the circumference of the aperture as the pedestal 241 rotates. In such implementations, the tabs 243 extend outwardly into the notches automatically when the tabs 243 are aligned with the notches. The interaction between the tabs 243 and notches enable the clamp 240 to be rotationally locked relative to the base 220.

Figure 38:
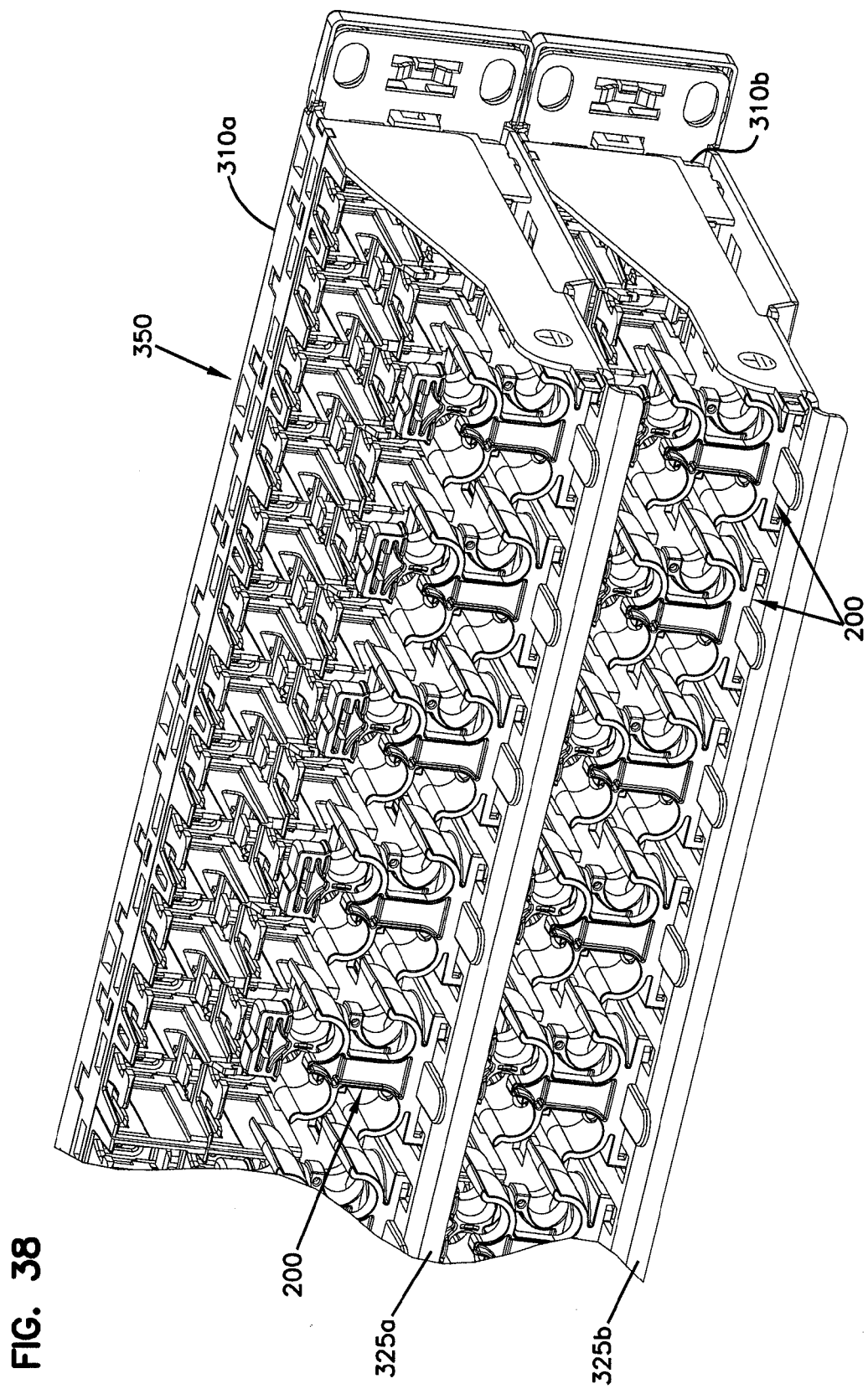
FIG. 38 is a rear perspective view of an example patch panel and frame at which multiple cable managers are arranged in two rows.
Figure 39:
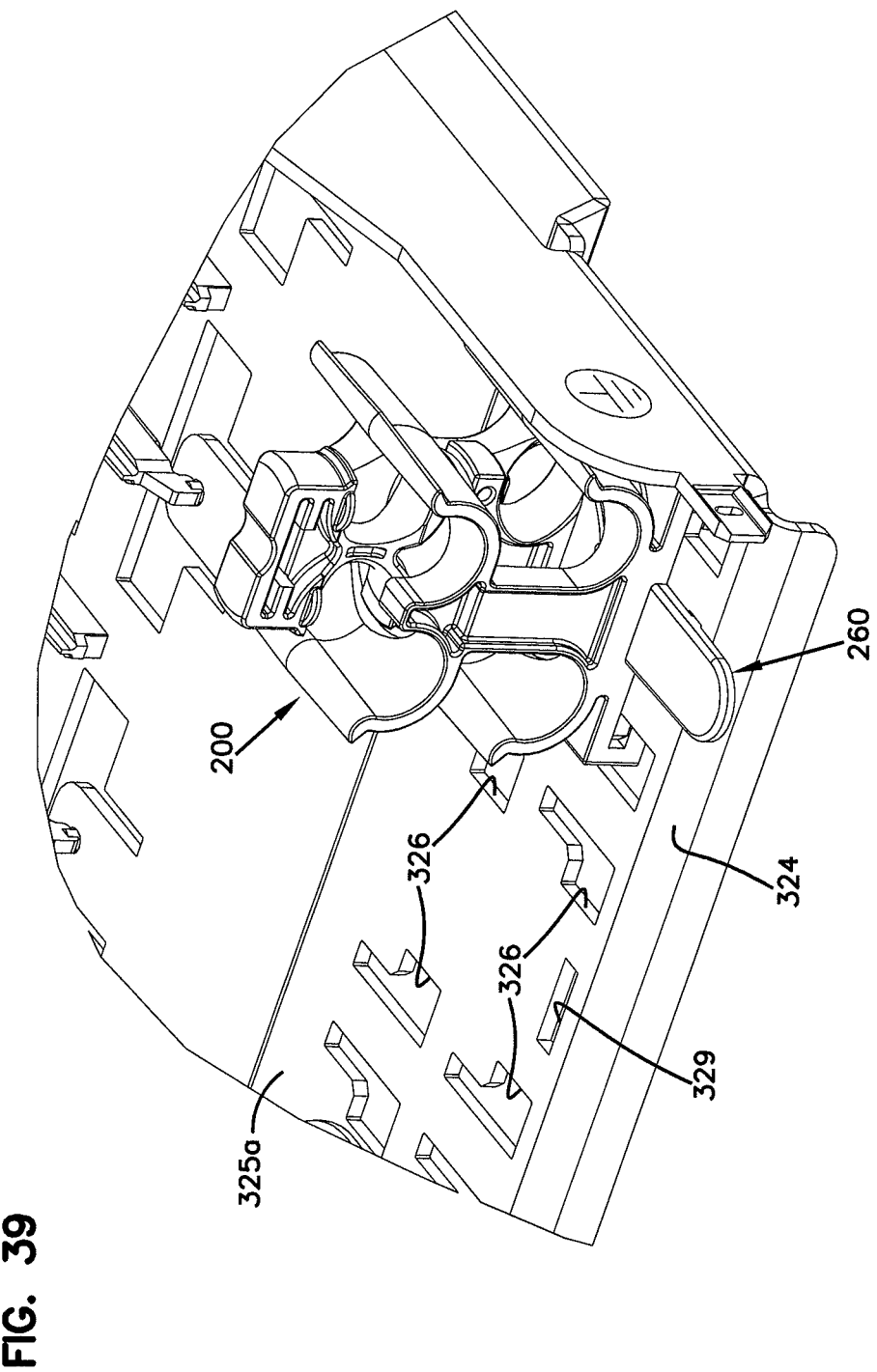
FIG. 39 is an enlarged view of a section of the frame of FIG. 38 with components removed for ease in viewing the manager mounted at the frame.
Figure 40:
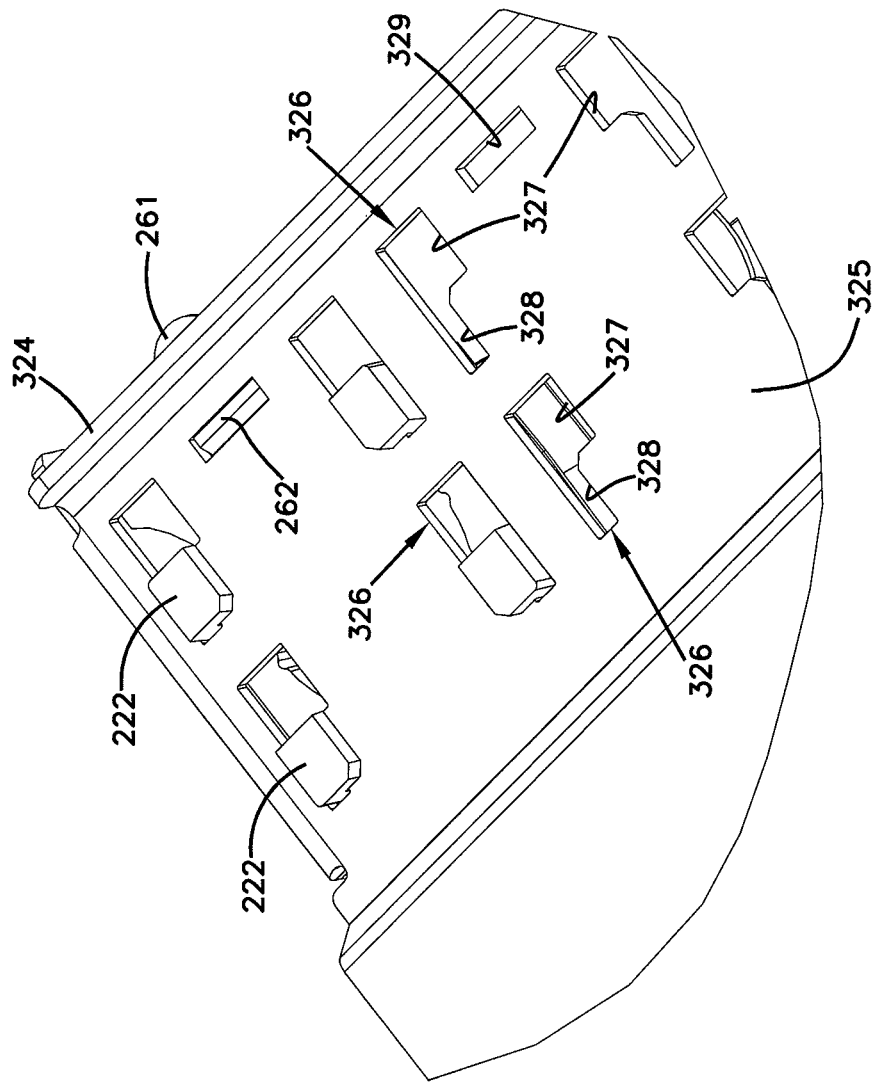
FIG. 40 is a bottom perspective view of the frame section of FIG. 39.

FIGS. 38-40 illustrate how the manager 200 may be mounted to a patch panel 350 or other termination location. The panel 350 of FIG. 38 includes a first panel 310a located above a second panel 310b. Each of the panels 310a, 310b is configured to hold a plurality of electrical jacks (e.g., RJ jacks). One or more frames 325 extend rearwardly from the patch panel 350. In the example shown, a first frame 325a extends outwardly from the first panel 310a and a second frame 325b extends outwardly from the second panel 310b. In other implementations, however, one frame 325 may service multiple panels 310a, 310b.

As shown in FIGS. 39 and 40, each frame 325 defines a plurality of apertures 326 at which the managers 200 may be mounted to the frame 325. In the example shown, the frame 325 defines four apertures 326 for each manager mount location on the frame 325. In the example shown, the four apertures 326 include two rows of opposing apertures 326. Each frame 325 has a curved section 324 that extends downwardly from a rear of the frame 325. The apertures 326 are offset inwardly towards the panel 310a, 310b from the curved section 324. To mount the manger 200 to the frame 325, the guide sections 222 are inserted through the first sections 327 of the apertures 326. The manager 200 is slid forwardly relative to the frame 325 to move the guide sections 222 to the section sections 328 of the apertures 326, thereby locking the manager 200 to the frame 325.

Each manager mount location also includes a latching opening 329. In the example shown, the latching opening 329 is disposed adjacent the curved section. The latching opening 329 is sized to receive the latch arrangement 262 of the retention tab 260 of the base 220. When the manager 200 is slid towards the second sections 328 of the apertures 326, the latching arrangement 262 slides over and snaps into the latching opening 329. Accordingly, the latching arrangement 262 inhibits movement of the manager 200 back to the first sections 327 of the apertures 326. To remove the manager 200 from the frame 325, a user may lift the flexible arm 261 of the retention tab 260 to raise the latching arrangement 262 out of the latching opening 329 to enable rearward movement of the manager 200.

The above specification provides a complete description of the present invention. Since many embodiments of the invention can be made without departing from the spirit and scope of the invention, certain aspects of the invention reside in the claims hereinafter appended.

The invention claimed is:

1. A cable manager comprising:
  a base including a mounting section, a first tier including at least one cable cradle, and a second tier including at least one cable cradle, the base defining a passage extending through the mounting section, the first tier, and the second tier, the second tier being axially spaced along the passage from the first tier; and
  a clamp including a first retaining section and a second retaining section, each retaining section defining a clamping surface, the clamping surface of the first retaining section being configured to oppose and cooperate with the cable cradle of the first tier of the base to manage a first cable, and the clamping surface of the second retaining section being configured to oppose and cooperate with the cable cradle of the second tier of the base to manage a second cable, such that the first retaining section and the second retaining section are configured to slide axially through the passage of the base to one of a plurality of axially fixed positions, the second retaining section being axially spaced along the passage relative to the first retaining section.

2. The cable manager of claim 1, wherein each tier includes the at least one cable cradle, such that the at least one cable cradle comprises a first cable cradle spaced laterally from a second cable cradle.

3. The cable manager of claim 2, wherein the clamp has a pedestal at a first end and a handle at a second end.

4. The cable manager of claim 2, wherein the clamp also is configured to rotate relative to the base to one of a plurality of rotationally fixed positions.

5. The cable manager of claim 2, wherein the clamp is configured to slide axially through the passage to one of three axially fixed positions.

6. The cable manager of claim 5, wherein the base includes a first retaining arrangement and the clamp includes a second retaining arrangement that cooperate to hold the clamp in the axially fixed positions.

7. The cable manager of claim 6, wherein the first retaining arrangement includes a lip that extends around part of a circumference of the passage.

8. The cable manager of claim 7, wherein the second retaining arrangement includes an upper lip and a lower lip, each of the lips extending around part of the circumference of the passage.

9. The cable manager of claim 1, further comprising a retention tab extending outwardly from the mounting section of the base, the retention tab including a downward-facing latching arrangement.

10. The cable manager of claim 1, wherein the mounting section includes four guide sections that each define a guide channel.

11. A cable patch panel comprising:
  a panel frame retaining a plurality of jacks disposed in a first row and a second row;
  a management frame extending rearwardly from the panel frame, wherein the management frame defines a plurality of apertures;
  a plurality of cable managers, each cable manager including a base and a clamp:
    the base defining a first tier of cable cradles facing away from the management frame, and a second tier of cable cradles facing away from the management frame, the base including:
      a mounting section, such that the mounting section further includes at least one mounting flange such that the at least one mounting flange is configured to engage a first aperture in the plurality of apertures, and
      a retention tab:
        configured to engage a second aperture in the plurality of apertures,
        oriented to engage the cable manager and the management frame, and
        including a release mechanism such that the release mechanism is oriented to releasably secure the cable manager to the management frame, and
    the clamp being moveable relative to the base between open and closed positions, wherein the cable cradles of the first and second tiers are covered by the clamp when the clamp is in the closed position, and wherein the clamp allows access to the cable cradles of the first and second tiers when the clamp is in the open position; and
  a plurality of cables extending rearwardly from the panel frame, the cables having ends terminated at the jacks, each of the cables terminated at the jacks in the first row being laid across a respective one of the cable cradles of the first tier of one of the cable managers and each of the cables terminated at the jacks in the second row being laid across a respective one of the cable cradles of the second tier of one of the cable managers.

* * * * *